United States Patent
Merg et al.

(10) Patent No.: US 10,643,158 B2
(45) Date of Patent: May 5, 2020

(54) TECHNICIAN TIMER

(71) Applicant: Snap-on Incorporated, Kenosha, WI (US)

(72) Inventors: Patrick S. Merg, Hollister, CA (US); Jacob G. Foreman, Hollister, CA (US); Todd Mercer, Descanso, CA (US); Roy Steven Brozovich, Campbell, CA (US)

(73) Assignee: Snap-on Incorporated, Kenosha, WI (US)

( * ) Notice: Subject to any disclaimer, the term of this patent is extended or adjusted under 35 U.S.C. 154(b) by 1070 days.

(21) Appl. No.: 15/088,464

(22) Filed: Apr. 1, 2016

(65) Prior Publication Data
US 2017/0286888 A1  Oct. 5, 2017

(51) Int. Cl.
G06Q 10/06 (2012.01)
H04N 5/232 (2006.01)
G06F 3/0481 (2013.01)
G06F 17/30 (2006.01)
G07C 5/08 (2006.01)

(52) U.S. Cl.
CPC ... G06Q 10/063114 (2013.01); G07C 5/0808 (2013.01); G06Q 10/0639 (2013.01); G07C 2205/02 (2013.01)

(58) Field of Classification Search
CPC ........ G06Q 10/063114; G07C 2205/02; G07C 5/0808
USPC ....................................................... 702/182
See application file for complete search history.

(56) References Cited

U.S. PATENT DOCUMENTS

| | | |
|---|---|---|
| 6,263,322 B1 | 7/2001 | Kirkevold et al. |
| 6,650,516 B2 | 5/2003 | Baird et al. |
| 6,615,120 B1 | 9/2003 | Rother |
| 6,714,846 B2 | 3/2004 | Trsar et al. |
| 6,768,935 B1 | 7/2004 | Morgan et al. |

(Continued)

FOREIGN PATENT DOCUMENTS

| | | |
|---|---|---|
| WO | 02/17118 A1 | 2/2002 |
| WO | 2004092918 A1 | 10/2004 |

(Continued)

OTHER PUBLICATIONS

Muller, Tobias Carsten; et al.; A Heuristic Approach for Offboard-Diagnostics in Advanced Automotive Systems; Apr. 20, 2009; 9 pages; SAE World Congress 2009, Detroit, MI, USA; SAE Document No. 2009-01-1027.

(Continued)

*Primary Examiner* — Cuong H Nguyen
(74) *Attorney, Agent, or Firm* — McDonnell Boehnen Hulbert and Berghoff LLP

(57) ABSTRACT

An example method includes receiving a first service procedure for servicing a vehicle, determining an expected pace of performance of the first service procedure, receiving at least one input signal during performance of the first service procedure, determining, based on the at least one input signal, a current pace of performance of the first service procedure, and providing for display of a first pace indicator on a display interface of the computing device, where the first pace indicator is representative of the current pace of performance of the first service procedure relative to the expected pace of performance of the first service procedure.

30 Claims, 14 Drawing Sheets

(56) References Cited

U.S. PATENT DOCUMENTS

| | | | |
|---|---|---|---|
| 6,845,307 | B2 | 1/2005 | Rother |
| 6,859,699 | B2 | 2/2005 | Carroll et al. |
| 6,901,372 | B1 * | 5/2005 | Helzerman ............ G06Q 10/06 705/7.14 |
| 7,117,194 | B2 | 10/2006 | Costantino et al. |
| 7,142,960 | B2 | 11/2006 | Grier et al. |
| 7,209,815 | B2 | 4/2007 | Grier et al. |
| 7,209,860 | B2 | 4/2007 | Trsar et al. |
| 7,363,129 | B1 | 4/2008 | Barnicle et al. |
| 7,373,225 | B1 | 5/2008 | Grier et al. |
| 7,373,226 | B1 | 5/2008 | Cancilla et al. |
| 7,551,993 | B1 | 6/2009 | Cancilla et al. |
| 7,555,376 | B2 | 6/2009 | Beronja |
| 7,698,104 | B2 | 4/2010 | Cousin et al. |
| 7,739,007 | B2 | 6/2010 | Logsdon |
| 7,953,615 | B2 * | 5/2011 | Aquila ................... G06Q 40/02 705/4 |
| 7,957,860 | B2 | 6/2011 | Grier et al. |
| 8,005,853 | B2 | 8/2011 | Cancilla et al. |
| 8,019,503 | B2 | 9/2011 | Andreasen et al. |
| 8,024,083 | B2 | 9/2011 | Chenn |
| 8,068,951 | B2 | 11/2011 | Chen et al. |
| 8,190,749 | B1 | 5/2012 | Chi et al. |
| 8,630,765 | B2 | 1/2014 | Chen |
| 8,825,271 | B2 | 9/2014 | Chen et al. |
| 8,977,423 | B2 | 3/2015 | Merg et al. |
| 9,014,908 | B2 | 4/2015 | Chen et al. |
| 9,117,319 | B2 | 8/2015 | Chen et al. |
| 9,142,066 | B2 | 9/2015 | Chen et al. |
| 10,445,835 | B1 * | 10/2019 | Hanson .................. G06Q 10/10 |
| 2002/0007237 | A1 | 1/2002 | Phung et al. |
| 2002/0065828 | A1 * | 5/2002 | Goodspeed ......... G06F 16/9566 |
| 2002/0138185 | A1 | 9/2002 | Trsar et al. |
| 2002/0184178 | A1 | 12/2002 | Tasooji |
| 2003/0004624 | A1 | 1/2003 | Wilson et al. |
| 2003/0093286 | A1 * | 5/2003 | Myers .................... G06Q 10/06 705/26.81 |
| 2003/0195681 | A1 | 10/2003 | Rother |
| 2004/0176885 | A1 | 9/2004 | Quinn |
| 2005/0015186 | A1 | 1/2005 | Kelly et al. |
| 2005/0085964 | A1 | 4/2005 | Knapp et al. |
| 2005/0272478 | A1 | 12/2005 | Larson et al. |
| 2006/0106797 | A1 | 5/2006 | Srinivasa et al. |
| 2007/0043487 | A1 | 2/2007 | Krzystofczyk et al. |
| 2008/0004764 | A1 | 1/2008 | Chinnadurai et al. |
| 2008/0183351 | A1 | 7/2008 | Grier et al. |
| 2009/0062977 | A1 | 3/2009 | Brighenti |
| 2009/0295559 | A1 | 12/2009 | Howell et al. |
| 2010/0063668 | A1 | 3/2010 | Zhang et al. |
| 2010/0179844 | A1 | 7/2010 | Lafergola et al. |
| 2011/0118905 | A1 | 5/2011 | Mylaraswamy et al. |
| 2011/0172874 | A1 | 7/2011 | Patnaik et al. |
| 2011/0218703 | A1 | 9/2011 | Uchida |
| 2011/0238258 | A1 | 9/2011 | Singh et al. |
| 2012/0040612 | A1 | 2/2012 | Lee et al. |
| 2012/0245791 | A1 | 9/2012 | Yun et al. |
| 2012/0303205 | A1 | 11/2012 | Subramania et al. |
| 2013/0223684 | A1 | 8/2013 | Townsend et al. |
| 2013/0304306 | A1 | 11/2013 | Selkirk et al. |
| 2013/0338873 | A1 * | 12/2013 | Baalu .................... G06Q 30/08 701/31.4 |
| 2014/0040266 | A1 * | 2/2014 | Johnson ................ G06F 16/284 707/737 |
| 2014/0075356 | A1 | 3/2014 | Gray et al. |
| 2014/0121888 | A1 | 5/2014 | Guo et al. |
| 2014/0207771 | A1 | 7/2014 | Merg |
| 2014/0277908 | A1 | 9/2014 | Fish et al. |
| 2015/0066781 | A1 | 3/2015 | Johnson et al. |
| 2015/0142255 | A1 | 5/2015 | Gormley |
| 2015/0221041 | A1 * | 8/2015 | Hanson .................. G06Q 10/10 705/4 |
| 2016/0371785 | A1 * | 12/2016 | Bray .................... G06Q 40/08 |

FOREIGN PATENT DOCUMENTS

| | | |
|---|---|---|
| WO | 2013063232 A1 | 5/2013 |
| WO | 2014001799 A1 | 1/2014 |

OTHER PUBLICATIONS

Jain, Anil K.; Mao, Jianchang; Mohiuddin, K.M; Artificial Neural Networks: A Tutorial; Mar. 1996; 14 pages; IEEE.

Jain, A.K.; Murty, M.N.; Flynn, P.J.; Data Clustering: A Review; Sep. 1999; 60 pages; ACM Computing Surveys, vol. 31, No. 3.

* cited by examiner

TECHNICIAN TIMER

BACKGROUND

Various types of vehicles produced by manufacturers occasionally have to be repaired. In some cases, a vehicle owner may notice a change in the performance of a vehicle, prompting the vehicle owner to bring the vehicle to a repair shop to diagnose a problem and potentially repair the vehicle. In other cases, an electronic control module of the vehicle may detect a fault and provide a malfunction indication via an instrument panel of the vehicle. If the vehicle owner notices the indication, the vehicle owner may bring the vehicle to a repair shop for service. Based on symptoms reported by the vehicle owner and/or automated error indicators such as diagnostic codes, a repair shop employee may identify one or more service procedures to perform on the vehicle in order to repair the vehicle. For instance, a service procedure may be followed by a mechanic at the repair shop to replace the vehicle's brake pads, fix a leaking tire, or service a vehicle's air conditioning system.

SUMMARY

In one example aspect, a method is provided that includes receiving, by a computing device, a first service procedure for servicing a vehicle. The method further includes determining an expected pace of performance of the first service procedure, where the expected pace of performance comprises a plurality of expected completion times of a plurality of steps of the first service procedure to complete the first service procedure by a target completion time. The method also includes receiving, by the computing device, at least one input signal during performance of the first service procedure. The method additionally includes determining, based on the at least one input signal, a current pace of performance of the first service procedure, where the current pace of performance of the first service procedure comprises one or more actual completion times of one or more steps of the plurality of steps of the first service procedure. The method further includes providing for display of a first pace indicator on a display interface of the computing device, where the first pace indicator is representative of the current pace of performance of the first service procedure relative to the expected pace of performance of the first service procedure.

In another example aspect, a device is provided that includes a display interface, one or more processors, a non-transitory computer readable medium, and program instructions stored on the non-transitory computer readable medium. The program instructions are executable by the one or more processors to receive a first service procedure for servicing a vehicle. The program instructions are further executable by the one or more processors to determine an expected pace of performance of the first service procedure, where the expected pace of performance comprises a plurality of expected completion times of a plurality of steps of the first service procedure to complete the first service procedure by a target completion time. The program instructions are also executable by the one or more processors to receive at least one input signal during performance of the first service procedure. The program instructions are also executable by the one or more processors to determine, based on the at least one input signal, a current pace of performance of the first service procedure, where the current pace of performance of the first service procedure comprises one or more actual completion times of one or more steps of the plurality of steps of the first service procedure. The program instructions are additionally executable by the one or more processors to provide for display of a first pace indicator on the display interface, where the first pace indicator is representative of the current pace of performance of the first service procedure relative to the expected pace of performance of the first service procedure.

In a further example aspect, a non-transitory computer readable medium is disclosed having stored therein instructions executable by one or more processors to cause a computing system to perform functions. The functions include receiving a first service procedure for servicing a vehicle. The functions further include determining an expected pace of performance of the first service procedure, where the expected pace of performance comprises a plurality of expected completion times of a plurality of steps of the first service procedure to complete the first service procedure by a target completion time. The functions also include receiving at least one input signal during performance of the first service procedure. The functions additionally include determining, based on the at least one input signal, a current pace of performance of the first service procedure, where the current pace of performance of the first service procedure comprises one or more actual completion times of one or more steps of the plurality of steps of the first service procedure. The functions further include providing for display of a first pace indicator on a display interface of a computing device, where the first pace indicator is representative of the current pace of performance of the first service procedure relative to the expected pace of performance of the first service procedure.

In still another aspect, a system is provided that includes means for receiving, by a computing device, a first service procedure for servicing a vehicle. The system further includes means for determining an expected pace of performance of the first service procedure, where the expected pace of performance comprises a plurality of expected completion times of a plurality of steps of the first service procedure to complete the first service procedure by a target completion time. The system also includes means for receiving, by the computing device, at least one input signal during performance of the first service procedure. The system additionally includes means for determining, based on the at least one input signal, a current pace of performance of the first service procedure, where the current pace of performance of the first service procedure comprises one or more actual completion times of one or more steps of the plurality of steps of the first service procedure. The system further includes means for providing for display of a first pace indicator on a display interface of the computing device, where the first pace indicator is representative of the current pace of performance of the first service procedure relative to the expected pace of performance of the first service procedure.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
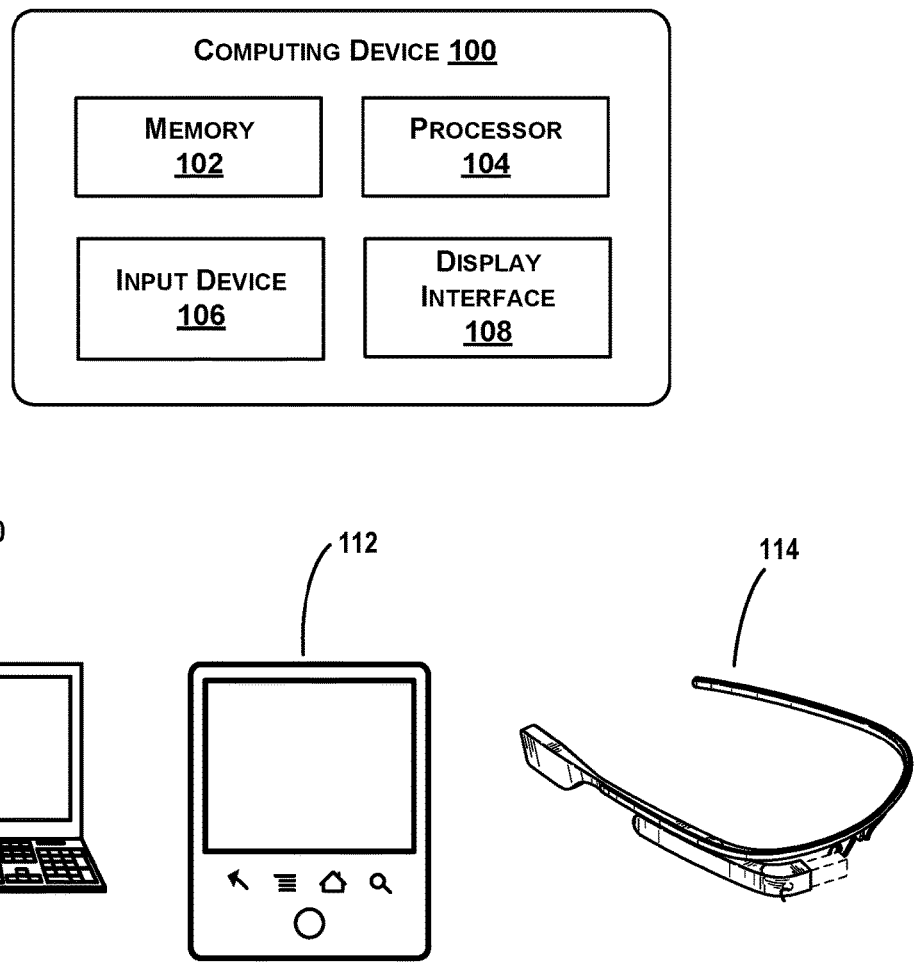
FIG. 1 illustrates several computing devices, according to an example embodiment.

The following detailed description describes various features and functions of the disclosed systems and methods with reference to the accompanying figures. In the figures, similar reference numbers identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

The example embodiments are applicable to a variety of repairable items, such as a vehicle or some other type of repairable machine or device. For purposes of this description, a vehicle is a mobile machine that may be used to transport a person, people, or cargo. As an example, any vehicle described herein may be driven or otherwise guided along a path (e.g., a paved road or otherwise) on land, in water, or in the air or outer space. As another example, any vehicle described herein may be wheeled, tracked, railed, or skied. As yet another example, any vehicle described herein may include an automobile, a motorcycle, a light-duty truck, a medium-duty truck, a heavy-duty truck, a semi-tractor, or a farm machine. As still yet another example, any vehicle described herein may include or use any appropriate voltage or current source, such as a battery, an alternator, a fuel cell, and the like, providing any appropriate current or voltage, such as about 12 volts, about 42 volts, and the like. As still yet another example, any of the vehicles described herein may include or use any desired system or engine. Those systems or engines may include items that use fossil fuels, such as gasoline, natural gas, propane, and the like, electricity, such as that generated by a battery, magneto, fuel cell, solar cell and the like, wind and hybrids or combinations thereof. As still yet another example, any vehicle described herein may include an electronic control unit (ECU), a data link connector (DLC), and a vehicle communication link that connects the DLC to the ECU.

Within examples, methods and devices are described for providing a pace indicator during performance of a vehicle service procedure (e.g., for a technician at a repair shop). More specifically, a computing device may receive a particular vehicle service procedure that includes a number of steps to be performed on a vehicle in order to complete the procedure. Example vehicle service procedures include repair procedures, scheduled maintenance procedures, preventative maintenance procedures, and vehicle overhaul procedures. Vehicle service procedures may be received in a digital format from a variety of different sources. For instance, the service procedure may be an original equipment manufacturer (OEM) procedure for a particular type of vehicle or vehicle component. The computing device may determine an expected pace in order to complete the service procedure by a target completion time. During performance of the service procedure, the computing device may then receive input signals that indicate when individual steps of the service procedure have been completed. Based on the input signals, a current pace of performance may be determined. A pace indicator representative of the current pace relative to the expected pace may then be displayed to a technician during performance of the service procedure (e.g., on a handheld device or a wearable portable device such as an HMD or a wrist display).

In some examples, a service procedure for a particular vehicle may be identified by a computing device based on vehicle symptom information reported by a vehicle owner and/or an automated system of the vehicle. For instance, the symptom information could be "engine hesitates on takeoff" or "engine is overheating." In other examples, the symptom information could include one or more diagnostic trouble codes (DTCs). A DTC may be a generic or manufacturer-specific code that is used to identify vehicle problems, such as "Throttle/Petal Position Sensor/Switch Malfunction" or "Transmission Control System Malfunction." In further examples, the symptom information can include an indication that a malfunction indicator lamp of the vehicle is illuminated. A service procedure may be selected by a computing device to be performed by a technician in order address identified symptoms. In other examples, a particular service procedure may be manually selected by the technician instead. For instance, a technician may request a particular service procedure (e.g., "Replace Brake Pads") for a particular type of vehicle (e.g., a 2003 Toyota Corolla).

Once a service procedure is received, an expected pace may be determined in order to complete the service procedure by a target completion time. In some examples, the target completion time may be received with the service procedure, or from a different remote source. For instance, the target completion time may be based on an accumulation (e.g., an average) of past completion times of the service procedure (e.g., a national average, an average for a particular region, or an average for a particular shop). In further examples, the target completion time may be determined based on past completion times of the service procedure on vehicles that share one or more attributes with the vehicle being serviced. For instance, the target completion time may be determined for vehicles with particular attributes, such as a particular year, make, model, and engine type (YMME). In other examples, the particular attributes may include a particular year, make, and model (YMM), or a particular year, make, model, engine type, and system (YMMES).

In alternative examples, the target completion time may be entered via a user interface of a computing device. For instance, a technician may enter an expected amount of time (e.g., 60 minutes) or an expected clock time (e.g., 3:00 P.M.) by which the technician expects to complete the service procedure.

An expected pace including expected completion times of particular steps of the procedure may be determined and used to help a technician complete the service procedure by the target completion time. The expected completion times for particular steps may also be represented either as amounts of time or clock times. In some examples, the expected completion times may be received from a server that compiles and averages past completion times of individual procedural steps from a database, possibly limited based on vehicle type, location, shop, time window, and/or other factors. In such examples, the computing device may also provide actual completion times back to the server in order to update the server's database. In other examples, one or more of the expected completion times may be entered via a user interface presented to a technician. In further examples, some or all of the expected completion times may be extrapolated based on the target completion time. For instance, for a service procedure with six steps that has a target completion time of thirty minutes, five minutes may be allocated to each step.

During performance of a service procedure, a computing device may receive input signals that provide an indication of the current pace of a technician. In some examples, the input signals may be verbal inputs (e.g., saying "next step") and/or physical action inputs (e.g., clicking a button) that enable a technician to progress through a repair procedure. In other examples, the computing device may query a technician to determine the current step being performed or to ask whether a certain step has been completed.

In further examples, an input signal may include video data. In particular, a service procedure may be provided to a technician via a portable display with a camera. For instance, an HMD with a camera may be used to visually present a service procedure, along with a virtual pace indicator. As a service procedure is performed, video data from the camera may be processed to determine which procedural step a technician is currently on, or what particular action a technician is currently taking.

In additional examples, an input signal may include a detected sound (e.g., detected by a microphone coupled to the computing device) during performance of the service procedure. For instance, the detected sound may be associated with a particular operation (e.g., a car starting). By identifying what operation is being performed by a technician, the detected sound may then be used to determine a completion time for the preceding step and/or the current step of a procedure. In other examples, the detected sound may be associated with a particular type of operation being performed by a technician with a tool, such as an air ratchet. By identifying when the particular type of operation is performed or completed by a technician, completion times of one or more steps of the procedure may be determined.

In further examples, an input signal may include sensor data received from a sensor coupled to a piece of vehicle service equipment. For instance, an oil filler may be instrumented with a flow sensor to detect when a certain amount of oil has been dispensed from the oil filler. The flow sensor may then send a signal to the computing device to indicate that a particular step or operation has been completed. Different types of sensor data from other types of sensors associated with vehicle service equipment may also be used as input signals.

Other types of input signals may be used as well or instead. Additionally, multiple different types of input signals may be combined in order to estimate the current pace of performance of a procedure.

The input signals may be used to determine a current pace of performance of the service procedure. More specifically, the current pace may include one or more actual completion times of one or more particular steps of the service procedure. The completion times of particular steps may be represented as amounts of time and/or clock times. Actual completion times may be compared to expected completion times for one or more steps of the procedure in order derive a pace indicator for display to the technician.

Within examples, the pace indicator may be presented in a number of different ways in order to provide an indication of how a technician's current pace compares to the expected pace. In one example, the pace indicator may be presented graphically as two bars, one bar corresponding to the expected pace and one bar corresponding to the current pace. The bar representing the expected pace may illustrate the number of steps expected to be completed at a given point in time, while the bar representing the current pace may illustrate the number of steps actually completed by that point in time. In another example, the pace indicator may identify an expected current step and an actual current step at a given amount of elapsed time. In a further example, the pace indicator may simply indicate whether a technician is ahead of schedule, on schedule, or behind schedule. In an additional example, the pace indicator may indicate an effective pay rate based on the current pace. The pace indicator may further indicate an amount of time elapsed during performance of the procedure, or an amount of time remaining (e.g., as a countdown clock). The pace indicator may be presented in other manners as well.

As previously noted, a technician may view a service procedure using a variety of computing devices, including touchpad devices, laptops, wearable computing devices (e.g., glasses, goggles, wrist displays), and other types of portable displays. A pace indicator may be displayed or communicated to a technician in various manners, including visual indications or warnings, audible indications or warnings, or tactile indications or warnings. Additionally, a portable computing device can communicate via multiple protocols, and can also link with one or more remote devices, such as a remote server, which may perform some of the functions described herein. Other types of devices and combinations of devices may also be used to provide and/or display vehicle service procedures with a pace indicator as well.

As mentioned above, this description describes several example embodiments. Within this description, the articles "a" or "an" are used to introduce elements of the example embodiments. The intent of using those articles is that there is one or more of the elements. The intent of using the conjunction "or" within a described list of at least two terms is to indicate any of the listed terms or any combination of the listed terms. The use of ordinal numbers such as "first," "second," "third" and so on is to distinguish respective elements rather than to denote a particular order of those elements.

Additional functionalities and examples of the described methods and computing devices are also described hereinafter with reference to the accompanying figures.

Referring now to the Figures, FIG. 1 illustrates an example computing device 100. The computing device 100 can represent any type of mobile or stationary computing device. By way of example, the computing device 100 can be a computer 110 that is located at a repair shop. However, the example is not meant to be limiting. In other instances, the computing device 100 can be a tablet device 112 or an HMD 114. In further examples, the computing device 100 could be a cellular phone, a different type of wearable computing device, including glasses, goggles, a smartwatch or other wrist display, a vehicle diagnostic device, or another type of computing device.

The computing device 100 may include at least one memory 102 and at least one processor 104. The processor 104 can be any type of processor, such as a microprocessor, digital signal processor, multicore processor, etc., coupled to the memory 102. The memory 102 can be any type of memory, such as volatile memory like random access memory (RAM), dynamic random access memory (DRAM), static random access memory (SRAM), or non-volatile memory like read-only memory (ROM), flash memory, magnetic or optical disks, digital versatile disk read-only memory (DVD-ROM), or compact-disc read-only memory (CD-ROM), among other devices used to store data or programs on a temporary or permanent basis.

The computing device 100 may also include at least one input device 106. The input device 106 may be any component configured to receive or detect an input signal during performance of a service procedure. The input device 106 may be capable of collecting input signals in a number of different modalities, including mechanical motion, audio input, visual input, etc. Examples of the input device 106 include a touchpad, a mouse, a keyboard, one or more buttons, a camera, a microphone, or a motion sensor. In some cases, the input device 106 may be configured to detect active input signals from a technician (e.g., a microphone detecting when a technician says "next step"). In other cases, the input device 106 may be configured to passively collect input signals as data without specific actions from the technician (e.g., a camera on an HMD collecting video data of a vehicle during performance of a service procedure). Other input devices besides the examples explicitly provided here may be used as well or instead.

The computing device 100 may also include at least one display interface 108. The display interface 108 could be any type of electronic visual display capable of presenting information to a technician. For instance, the display 108 could be capable of presenting visual information in a variety of ways, including text, two-dimensional visual images and/or three-dimensional visual images. In additional examples, the display 108 may be capable of presenting information to a technician in other ways (e.g., audio, haptics) as well or instead. Example displays include computer monitors, touchscreens, HMD's, or wrist displays. In some examples, the display 108 may be capable of displaying an augmented reality presentation in which the display shows a presentation of images or video taken of a vehicle during performance of a procedure with virtual annotations overlaid on the presentation. Other types of electronic displays may also be used.

In further examples, the computing device 100 can include a communication interface to facilitate communication with a communication network according to one or more wired or wireless communication standards or protocols. For instance, the communication interface can facilitate data communication over one or more network links. The communication interface can include a transmitter to transmit data and a receiver to receive data. Alternatively, the communication interface can include a transceiver configured to transmit and receive data. In some instances, the computing device 100 can communicate with a server or a component of a server that is located remotely from the computing device 100 (e.g., in a cloud computing environment). For example, the computing device 100 can be a desktop computer, workstation, or other type of computing device configured to operate within a client-server architecture.

In some examples, the computing device 100 may be connected to a personal area network (PAN) that is used for data transmission among multiple devices such as computers, wearable devices, telephones, and diagnostic devices. The PAN can be configured according to any of a variety of standards, protocols, or specifications. For example, the PAN can be configured according to a universal serial bus (USB) specification 2.0, 3.0, or 3.1 developed by the USB Implementers Forum. As another example, the PAN can be configured according to an Institute of Electrical and Electronics Engineers (IEEE) standard, such as an IEEE 802.11 standard (e.g., 802.11a, 802.11b, 802.11g, or 802.11n) or an IEEE 802.15 standard (e.g., 802.15.1, 802.15.3, 802.15.4, or 802.15.5) for wireless PAN.

The radio waves transmitted or received by a communication interface can be arranged in accordance with one or more wireless communication standards or protocols such as an IEEE 802.15.1 standard for wireless personal area networks (PANs), a Bluetooth version 4.1 standard developed by the Bluetooth Special Interest Group (SIG) of Kirkland, Wash., or an IEEE 802.11 standard for wireless LANs (which is sometimes referred to as a Wi-Fi standard), or a cellular wireless communication standard such as a long term evolution (LTE) standard, a code division multiple access (CDMA) standard, an integrated digital enhanced network (IDEN) standard, a global system for mobile communications (GSM) standard, a general packet radio service (GPRS) standard, a universal mobile telecommunications system (UMTS) standard, an enhanced data rates for GSM evolution (EDGE) standard, or a multichannel multipoint distribution service (MMDS) standard.

The computing device 100 may also be connected to a wide area network (WAN). The WAN can carry data using packet-switched or circuit-switched standard. The WAN can include an air interface or wire to carry the data.

In further examples, the computing device 100 may be provided with access to vehicle service procedures from a vehicle service procedures database. In some cases, the vehicle service procedures database may be connected to the computing device 100 via a communication network. In other embodiments, the vehicle service procedures database can be directly connected to or a component of the computing device 100. The vehicle service procedures database can store a plurality of vehicle service procedures, which may be OEM procedures provided by manufacturers of different types of vehicles or vehicle components. Each service procedure can include a plurality of steps pertaining to a particular type of vehicle repair. In some examples, multiple vehicle service procedures databases may be accessible by computing device 100. For instance, each vehicle service procedures database may store service procedures pertaining to particular vehicle components or systems. Additionally, different vehicle service procedures databases may store service procedures pertaining to different types of vehicles (e.g., different makes, models, years, etc.) as well or instead.

In some instances, the computing device 100 may report certain information about a vehicle to be repaired, which may include a vehicle type and vehicle symptoms. The vehicle type may include vehicle attributes (e.g., year, make, model, engine type) as well as usage information (e.g., mileage, geography). The vehicle symptoms may be one or more conditions exhibited by the vehicle and/or reported by a vehicle owner such as "engine hesitates on takeoff," "rough engine idle," "engine cranks but won't start," "poor gas mileage," or "check engine light is on." A check engine light can also be referred to as a malfunction indicator lamp that, when illuminated on an instrument panel of a vehicle, indicates a malfunction of a computerized engine management system of the vehicle. Alternatively or in addition, the vehicle symptoms may include one or more DTCs and/or an indication that a malfunction indicator lamp of the vehicle is illuminated.

Based on the vehicle type and the vehicle symptoms, the computing device 100 and/or a remote computing system may identify at least one service procedure from a vehicle service procedures database for servicing the vehicle. In some examples, the service procedure may be an OEM procedure provided in an electronic format by a manufacturer of the vehicle type and/or specific vehicle components. For instance, the service procedure may include steps to locate and replace a particular electronic sensor contained within the engines of vehicles of vehicle type. In some examples, the service procedure may be automatically selected by computing device 100 and/or another computing device based on the vehicle type and vehicle symptoms. In other examples, a service procedure may be manually selected by a technician using computing device 100 via a user input interface of client device 100. A vehicle service procedure may be identified to be performed in other ways as well.

Figure 2:
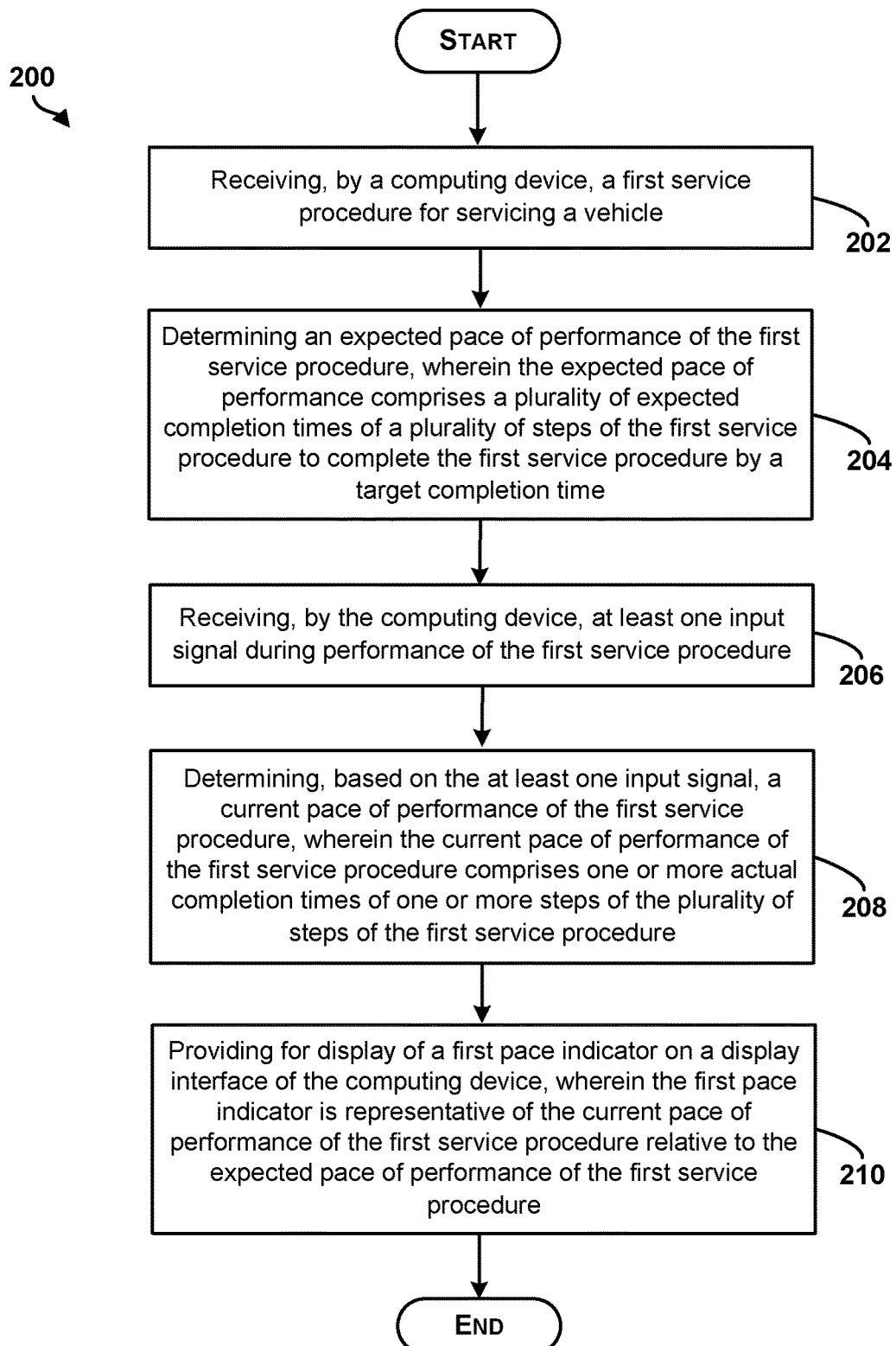
FIG. 2 is a block diagram of a method, according to an example embodiment.

Turning now to FIG. 2, FIG. 2 is a block diagram of an example method 200 for providing a pace indicator, according to an example embodiment. Method 200 shown in FIG. 2 presents an embodiment of a method that could be used or implemented by computing device 100 of FIG. 1, for example, or by components of computing device 100, or more generally by any of a variety of computing devices. Method 200 can include one or more operations, functions, or actions as illustrated by one or more of blocks 202-210. Although the blocks are illustrated in a sequential order, these blocks can also be performed in parallel, and/or in a different order than those described herein. Also, the various blocks can be combined into fewer blocks, divided into additional blocks, and/or removed based upon the desired implementation.

In addition, for the method 200 and other processes and methods disclosed herein, the block diagram shows functionality and operation of one possible implementation of present embodiments. In this regard, each block can represent a module, a segment, or a portion of program code, which includes one or more instructions executable by a processor or computing device for implementing specific logical functions or steps in the process. The program code can be stored on any type of computer-readable medium, for example, such as a storage device including a disk or hard drive. The computer-readable medium can include non-transitory computer-readable medium, for example, such as computer-readable media that stores data for short periods of time like register memory, processor cache and random access memory (RAM). The computer-readable medium can also include non-transitory media, such as secondary or persistent long term storage, like read only memory (ROM), optical or magnetic disks, compact-disc read only memory (CD-ROM), for example. The computer-readable medium can also be any other volatile or non-volatile storage systems. The computer-readable medium can be considered a computer-readable storage medium, for example, or a tangible storage device.

In addition, for the method 200 and other processes and methods disclosed herein, each block in FIG. 2 can represent circuitry that is wired to perform the specific logical functions in the process.

Initially, at block 202, the method 200 includes receiving a first service procedure that includes a plurality of steps for servicing a vehicle. More specifically, the first service procedure may be received by a computing device from a data source that includes computer-readable service procedures, such as OEM procedures. In some examples, the first service procedure may be received at a point in time before a vehicle is brought in for service. In other examples, the first service procedure may be received in response to a request from the computing device, such as an HMD used by a technician while servicing a particular vehicle. In further examples, the first service procedure may be received from a remote database or from a database on the device itself.

Figure 3:
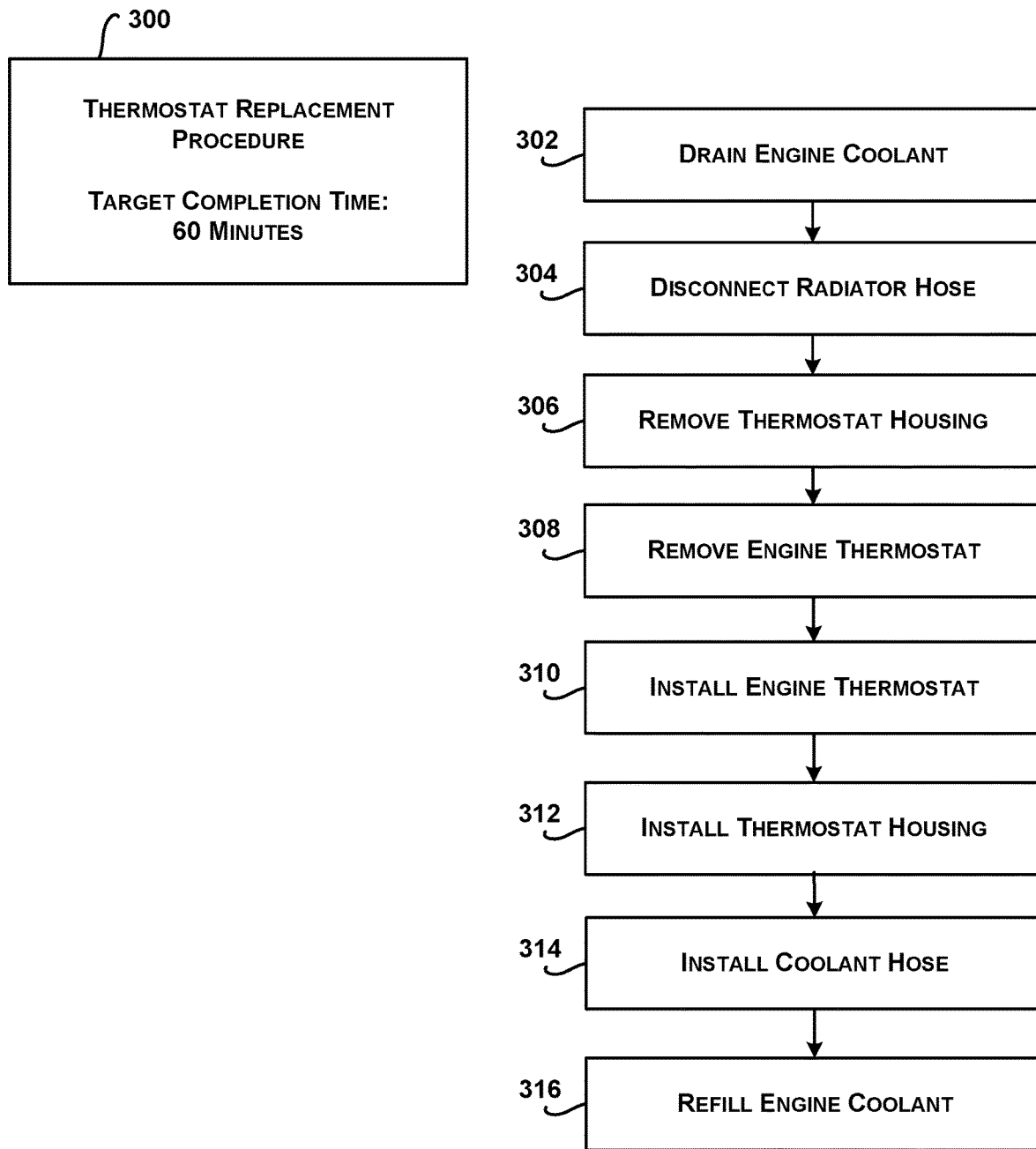
FIG. 3 illustrates a vehicle service procedure, according to an example embodiment.

FIG. 3 illustrates an example vehicle service procedure. More specifically, thermostat replacement procedure 300 may include steps 302-316 for replacing an engine thermostat in a particular type of vehicle, such as a 2007 Chevy Cobalt. Each block 302-316 may represent a section of computer-readable medium accessible by a computing device to display each of the steps 302-316. In some examples, each of the blocks 302-316 may include a module, a segment, or a portion of program code, which includes one or more instructions executable by a processor or computing device to provide a presentation of the steps 302-316, the display of which may include various types of visual, auditory, and/or other types of output. Various types of information may be included within blocks 302-316, and made accessible to a technician during performance of the procedure. Other vehicle service procedures may include fewer or more steps than thermostat replacement procedure 300 illustrated here. Further, a vehicle service procedure may apply to various types of vehicles, including, for example, multiple years of a particular model, or multiple models of a particular make.

Referring back to FIG. 2, method 200 may further involve determining an expected pace of performance of the first service procedure, as shown by block 204. More specifically, the computing device may determine an expected pace by determining expected completion times of individual steps of the service procedure such that the service procedure will be completed by a target completion time. The expected completion times may be represented as clock times or as amounts of time. In the case of amounts of time, the amounts may correspond to expected amounts of time to complete the corresponding individual steps, or to total expected amounts of time elapsed when the corresponding steps are completed (including previous steps).

Figure 4:
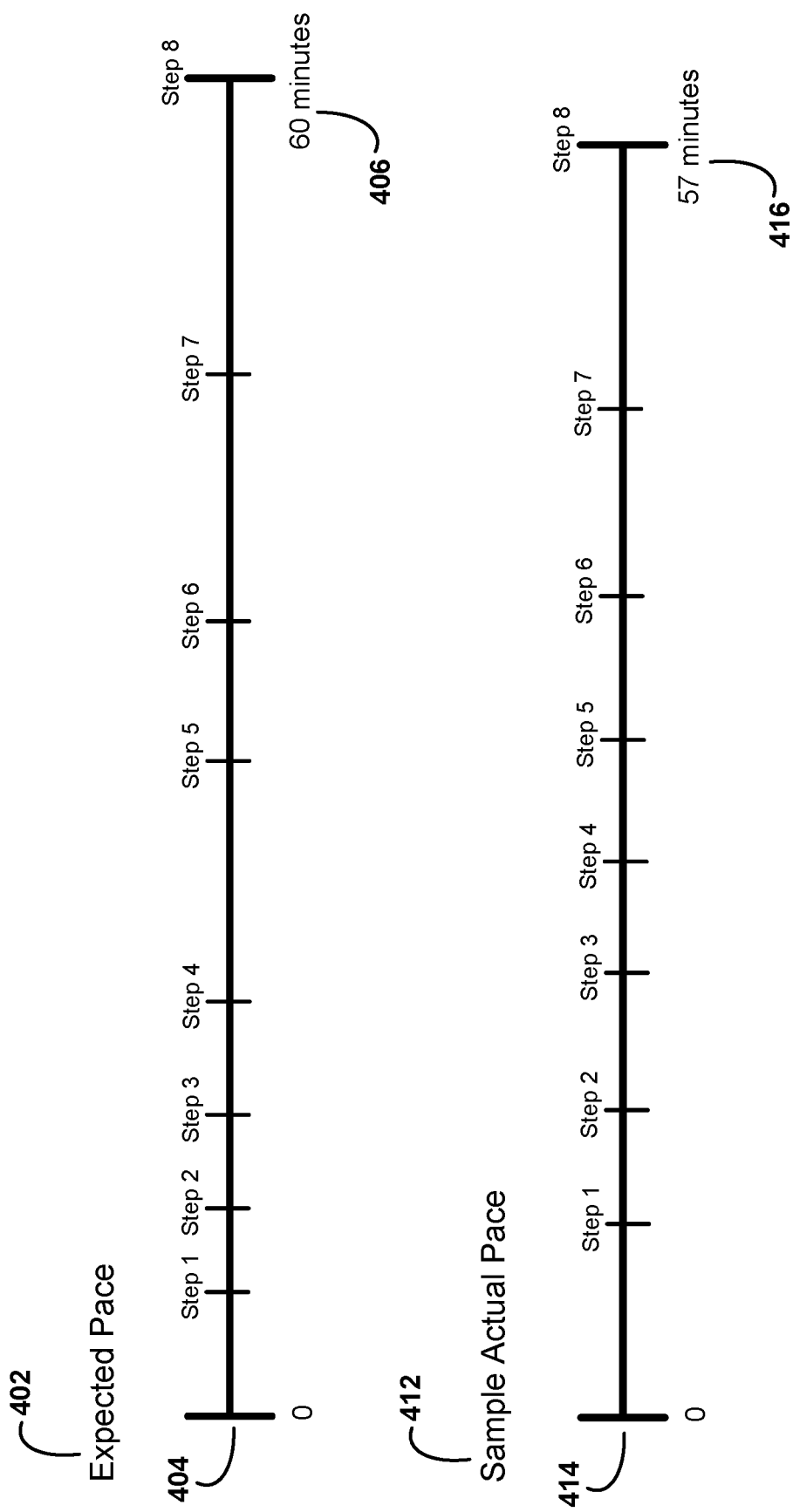
FIG. 4 illustrates an expected pace of performance and a sample actual pace of performance, according to an example embodiment.

FIG. 4 illustrates an expected pace of performance and a corresponding sample actual pace of performance, according to an example embodiment. More specifically, the expected pace 402 may be represented as target completion times for the steps of a procedure along a timeline 404. The procedure may be a vehicle service procedure that has eight steps and a target completion time of 60 minutes, such as the thermostat replacement procedure illustrated by FIG. 3. Expected completion times for steps 1 through 8 may be determined as illustrated by the placement of the steps along the timeline 404 so that the procedure may be completed by a target completion time 406 of 60 minutes. For instance, step 1 may have an expected completion time of five minutes indicating that step 1 should be completed five minutes after starting the procedure, step 2 may have an expected completion time of eight minutes, indicating that step 2 should be completed eight minutes after starting the procedure, and so on. Alternatively, the expected completion time for step 2 may only represent the expected time to complete step 2 (e.g., three minutes).

The expected pace of performance, such as expected pace 402 illustrated by FIG. 4, may be determined in a number of different ways. In some examples, the target completion time for the procedure as well as target completion time for individual steps may be determined by averaging past completion times of the procedure and individual steps. For instance, expected completion times for the steps of the procedure illustrated in FIG. 3 may be determined by averaging together past completion times for the same steps previously performed on other vehicles. In some cases, the set of past completion times used to determine the expected completion times may be limited based on vehicle type (e.g., 2007 Chevy Cobalts), location (e.g., particular region or particular shop), and/or time window (e.g., procedures performed in the past year). In some examples, the target completion time for the procedure and target completion times for individual steps may be determined by a remote server that compiles data from past procedures, and then transmitted to the computing device at the service location.

In additional examples, a target completion time for a service procedure may be retrieved from a labor time guide that provides labor time estimates. The labor time guide may be provided by an OEM manufacturer or a different third party. In some examples, the labor time estimate from a labor time guide may provide an initial baseline estimate which may then be adjusted based on data indicating actual past completion times for a service procedure in order to determine a target completion time for the procedure.

In further examples, determining the expected pace of performance may involve receiving one or more target times via a user interface of the computing device. For instance, a technician may enter his own target completion time for the procedure. In another example, the target completion time for the procedure may be derived based on past procedure time data, and then a technician may use a user interface to set his own expected completion times for individual steps in order to hit the target completion time.

In additional examples, determining the expected pace of performance may involve extrapolating one or more target times. For instance, a target completion time for a procedure may be provided by a remote server or by a technician, but expected completion times for some or all of the steps of the procedure may not be provided. In such an example, expected completion times for individual steps may be derived, for instance, by allocating the target completion time equally across the steps.

In yet further examples, the expected pace of performance may be determined based on past performance data for a particular technician. For instance, the target completion time for the procedure may be determined by averaging together completion times of the same procedure and/or similar procedures performed by the same technician. Similarly, expected completion times for individual steps of the procedure may be determined by averaging together past completion times for the same steps by the same technician. In such examples, the computing device may record performance times for one or more technicians over time in order to determine future expected paces.

Referring back to FIG. 2, the method 200 may further involve receiving at least one input signal during performance of the first service procedure, as shown by block 206. More specifically, input signals may be received by the computing device using one or more input devices coupled to (e.g., physically connected to or in communication with) the computing device. In some cases, the input signals may include active input from a technician performing a service procedure. For instance, an input signal may include an audible "next step" spoken by the technician upon completing a step of the procedure, and recorded by a microphone coupled to the computing device. As another example, an input signal may include touch input from a technician on a touchscreen of the computing device indicating that a current step of the procedure is complete, and requesting the computing device to display the next step of the procedure.

In further examples, some or all of the input signals may not require active interaction by a technician. For instance, a video camera coupled to the computing device may record video data of the vehicle while a service procedure is performed on the vehicle. The video data may be processed in order to determine the current step being performed and/or which steps have been completed by the technician.

In some examples, processing of video data showing the vehicle may involve comparing the video data to previously collected images of procedural steps before completion, during performance, and/or after completion. For instance, in reference to the procedure depicted in FIG. 3, screen shots from video data of the vehicle may be identified that correspond to images showing that the first thermostat housing bolt has been removed, then showing that the second thermostat housing bolt has been removed, and then showing that the thermostat housing has been removed. The video data may therefore be processed both to determine how far along step 306 (to remove the thermostat housing) is at different points in time, and also to determine a completion time of step 306. Subsequently, the video data may then be compared to images showing that the thermostat has been removed (e.g., by comparing the video data to an image of a vehicle after the thermostat has been removed), then showing that the thermostat gasket surface is being cleaned (e.g., by comparing the video data to an image of a vehicle showing the thermostat gasket surface being cleaned), and so on. Such processing of video data and/or still images may occur locally on a computing device and/or by a remote computing system.

In further examples, a computing device may use preceding images in order to determine context for matching a particular image from video data to a procedural step. In some examples, the computing device may not be able to resolve between multiple steps of a procedure based on a single image. For instance, an image may be recorded of a bolt removed from the thermostat housing of a vehicle. However, it may not be clear whether the bolt was just removed from the thermostat housing by a technician, or the bolt is about to be installed by the technician. In such a scenario, the computing device may process one or more proceeding images for context. More specifically, when the computing device is only able to conclude that a captured image corresponds to one of multiple different possible steps, the computing device may process additional previously captured images until the computing device is able to identify the actual current step being performed by the technician.

In other examples, a computing device may be configured to identify one or more synch points within a procedure. More specifically, a synch point may be an event like a major component removal that must be completed before one or more future steps of a procedure can be performed. In some examples, a technician may skip certain steps of a procedure and/or perform certain steps out of order. In such a scenario, a computing device may identify images from the video feed that do not correspond to the steps expected to be performed by the technician. In response, the computing device may monitor images from the video data to look for a synch point. When the synch point is identified, the computing device may then update the current pace of performance of the job relative to the expected pace. In some examples, synch points for particular procedures and/or particular types of synch points may be predetermined and stored on the computing device.

As a specific example, a procedure from a service manual to replace the timing belt from a vehicle may involve twenty procedural steps. In practice, a technician may perform most of the steps in some semblance of order that does not exactly match the service manual. Additionally, the technician may know several short cuts and may bypass three steps, which may disrupt pace tracking. Step ten of the procedure may be to remove the timing belt. In a scenario where the computing device loses track of the current step being performed or the current pace, the computing device may then monitor images (and/or other inputs such as audio) to determine when step ten, which cannot be skipped, is performed by the technician. Once step ten is identified and the timing belt is removed from the vehicle, the computing device may then update the current pace of performance based on the completion time of step ten.

In additional examples, input signals may be received in response to queries made to the technician. For instance, a computing device may conclude that a particular step is likely complete based on video data, and may then confirm that the step is complete by presenting a question to the technician (e.g., a written query on a display or a spoken query). An input signal may then be a response (e.g., a verbal response or a touch input) from the technician that is detectable by an input device coupled to the computing device.

In further examples, the input signals may also include a start signal indicating when the first service procedure has been started by a technician. For instance, a technician may select the procedure on a touchpad interface in order to display the steps of the procedure, which may be used as an indication of the time at which the procedure was started. As another example, video data from a video camera (e.g., on an HMD) may be processed in order to determine a procedure start time based on when the technician physically starts a first step of the procedure.

In some examples, the first service procedure may involve a list of scheduled maintenance operations instead of a repair procedure. For instance, a technician may perform a service job on a vehicle at 60,000 miles, which may include a number of different operations, including rotating the tires, changing the oil, topping up fluid levels, and so on. A computing device may determine completion times of each of these operations, which may in some cases be performed in a number of different orders by a technician. In some cases, the computing device may identify when particular operations have been started or completed based on the equipment being used by the technician.

In one example, an input signal may be a signal received from a sensor associated with a particular piece of vehicle service equipment. For instance, a particular type of car may take seven quarts of oil. A technician may fill engine oil and other fluids from a hose reel. The activity of filling the oil may be monitored by instrumenting the filler to determine when a step of the procedure is complete (e.g., when seven quarts of oil have been dispensed). For instance, the hose reel may be fitted with a flow sensor that transmits a signal to the computing device indicating when seven quarts of oil have been dispensed. In another example, a ball float liquid level sensor or another type of sensor may be used to determine when a certain amount of fluid has been dispensed and/or filled instead.

In a further example, vehicle service equipment may be set up based on the type of vehicle being serviced. For instance, a hose reel may be pre-metered to fill a predetermined target amount of oil (e.g., seven quarts) for a particular vehicle type. When the pre-metered amount has been dispensed, the hose reel may responsively send a signal to the computing device (e.g., via a wireless communication channel). The signal may be used by the computing device to determine that the current step of the procedure is complete, and to update the pacing information accordingly.

In another example, a service procedure may include a step to balance the wheels of a vehicle. The step may involve the use of a wheel balancer by a technician. The wheel balancer may be preset with an expected wheel size based on the type of vehicle being serviced. Additionally, the wheel balancer may be equipped with a sensor that sends a signal indicating that the wheel balancer has been used to balance a wheel. Assuming a step of the procedure involves balancing four wheels of the vehicle, the computing device may determine the completion time of the step to be the time when a fourth signal from the wheel balancer is received indicating that all four wheels of the vehicle have been balanced. In this case, the expected number of operations performed with the wheel balancer during the procedure is four. The expected number of operations could be different for a different type of equipment or vehicle in other examples.

In a further example, an input signal may be a detected sound, such as a sound detected by a microphone that is physically coupled to or in remote communication with the computing device. For instance, the detected sound could be the sound of a car starting or the sound of a particular tool such as an impact wrench. The computing device may identify that the detected sound is associated with a particular operation or step of a procedure based on prior knowledge of sounds expected to occur during performance of a procedure. The computing device may use a detected sound to determine completion times of one or more steps of the service procedure.

In some examples, the computing device may have access to data storage containing a mapping of different operations to different expected sounds. An expected sound for a particular operation may be represented as an expected amplitude of sound within one or more particular frequency ranges. In another example, an expected sound for a particular operation may be represented as amplitudes of sound in one or more different frequency ranges over a time domain. Detected sounds may be matched to expected sounds to identify when a particular operation has been performed on the vehicle.

In further examples, different expected sounds may be stored for different operations performed with a particular tool. For instance, it may be determined based on collected images or video data that a technician is using an air ratchet with a socket on a thermostat housing bolt. However, it may not be possible to determine from the images whether a loosening or tightening operation is being performed with the air ratchet. In this instance, the sound of the tool may be used to determine which operation is being performed based on when the tool works harder. If the tool works harder at the beginning (e.g., the frequency increases over time), the sound indicates a loosening operation. If the tool works harder at the end (e.g., the frequency reduces over time), the sound indicates a tightening operation. Once the operation being performed is identified based on sound, the pacing information for the procedure may be updated accordingly.

In some examples, a particular tool may first be identified based on video data. The computing device may then attempt to identify detected sounds associated with one or more types of operations performed with the particular identified tool. In other examples, the particular tool being used may itself be identified based on detected sounds as well.

In another example, the computing device may process detected sounds to determine when an expected number of operations have been performed, which may indicate completion of a step of the service procedure. For instance, removing a particular vehicle component may involve the step of removing four bolts. The computing device may identify four separate detected sounds associated with a bolt being removed. When the fourth detected sound is identified, the computing device may determine a completion time for the step of removing the four bolts.

Other types of input signals may be used as well or instead to determine a current pace of performance of a service procedure. In some cases, different types of input signals may be combined in order to estimate the current pace. Additionally, input signals may be processed locally at the computing device and/or remotely by a remote server in order to determine the current pace. For instance, video data from a camera on an HMD worn by a technician may be processed locally on the HMD, or the video data may be communicated to a remote server for processing.

The method 200 may further involve determining a current pace of performance of the first service procedure, as shown by block 208. More specifically, the current pace may include actual completion times of individual steps of the procedure. The actual completion times may be recorded as clock times, amounts of time elapsed from the start of the procedure (e.g., as indicated by a start signal), or amounts of time used by a technician to complete individual steps. The actual completion times may be determined based on the input signals received during performance of the procedure. For instance, each time a microphone on the computing device detects that the technician has said "next step," the clock time may be recorded as a completion time for the current step, and the next step may be displayed on a display interface of the computing device. In other examples, actual completion times may be inferred from video data and/or other input signals as well or instead.

In reference to FIG. 4, a sample actual pace 412 is illustrated, with steps 1 through 8 of a service procedure having actual completion times as marked along the timeline 414. A current pace of performance may be determined based on the actual completion times of previous steps at different points in time along the timeline 414. For instance, when step 3 is completed, the current pace is behind the expected pace 402, in which step 4 is already complete. When step 7 is completed, the current pace is ahead of the expected pace 402, for which the expected completion time for step 7 has not yet been reached.

As illustrated in FIG. 4, a technician may be behind schedule for several steps of a procedure, but may then catch up and complete the procedure at an actual completion time 416 of 57 minutes, which is less than the target completion time 406 of 60 minutes. In such a scenario, the display of a pace indicator may be beneficial to inform a technician that he is behind schedule and needs to speed up in order to meet the target completion time.

Referring back to FIG. 2, the method 200 may further involve providing for display of a first pace indicator on a display interface of the computing device, as shown by block 210. More specifically, a pace indicator may provide an indication of the current pace of performance of the service procedure relative to the expected pace of performance. The pace indicator may be provided in a digital format that enables a computing device to display the pace indicator as, for example, text, images, graphics, auditory feedback, and/or tactile feedback. In some examples, the pace indicator may be displayed continuously, for instance, as a side-by-side graphical representation of the expected pace and the current pace. In other examples, the pace indicator may be displayed at discrete points in time, for instance, as auditory updates provided to the technician at a predetermined interval (e.g., every five minutes). In further examples, the pace indicator may only be displayed in certain situations, such as when performance of the service procedure is behind schedule.

As noted, a pace indicator may be displayed or otherwise presented to a technician using a computing device in a variety of ways. In some examples, different modes of presenting information may be used depending on the type of computing device being used by a technician. For instance, a pace indicator may be presented as text on a wrist display, as computerized images on a touchpad, or as overlaid virtual annotations on an HMD. Other methods of computerized presentation of information may also be used.

In some examples, a pace indicator may indicate whether performance of a procedure is behind schedule, on time, or ahead of schedule. For instance, a red light may be displayed if performance is behind schedule, a yellow light may be displayed if performance is on time, and a green light may be displayed if performance is ahead of schedule.

In other examples, the pace indicator may provide an indication of how far ahead or behind schedule performance of a procedure is. For instance, graphics or text may indicate how many steps are expected to be complete by the current time, as well as how many steps have actually been completed. In some cases, direct comparison of the expected pace and current pace may not always be possible. For instance, it may not be possible to determine actual completions of certain steps based on video data as the input signal. In other cases, a technician may perform one or more steps out of order. In such scenarios, the pace indicator may be extrapolated to provide an estimate of the current pace relative to the expected pace based on the information available.

In further examples, the pace indicator may include a clock that counts up from zero to the target completion time, or down from the target completion time. In particular, an elapsed amount of time during performance of the procedure and/or an amount of time remaining from the target completion time may be displayed. In additional examples, separate clocks may also be displayed for individual steps, indicating time elapsed or time remaining relative to a target completion time for the individual steps.

FIGS. 5A, 5B, 5C, 5D, and 5E are conceptual illustrations of a display interface of a computing device that displays a pace indicator, according to an example embodiment. For instance, the display interface can be an interface of a computing device that receives a service procedure and displays procedural steps to a technician. The display interface may be an interface of any of the types of computing devices described herein, including a laptop computer, a stationary computer, a wearable computing device including an HMD or a wrist display, a smartphone, or a touchpad device. Additionally, while pace indicators are displayed graphically and as amounts of elapsed time here for purposes of illustration, they could be displayed as text, numbers, computerized images, auditory feedback, tactile feedback, and/or as some other type of presentation as well or instead.

Figure 5A:
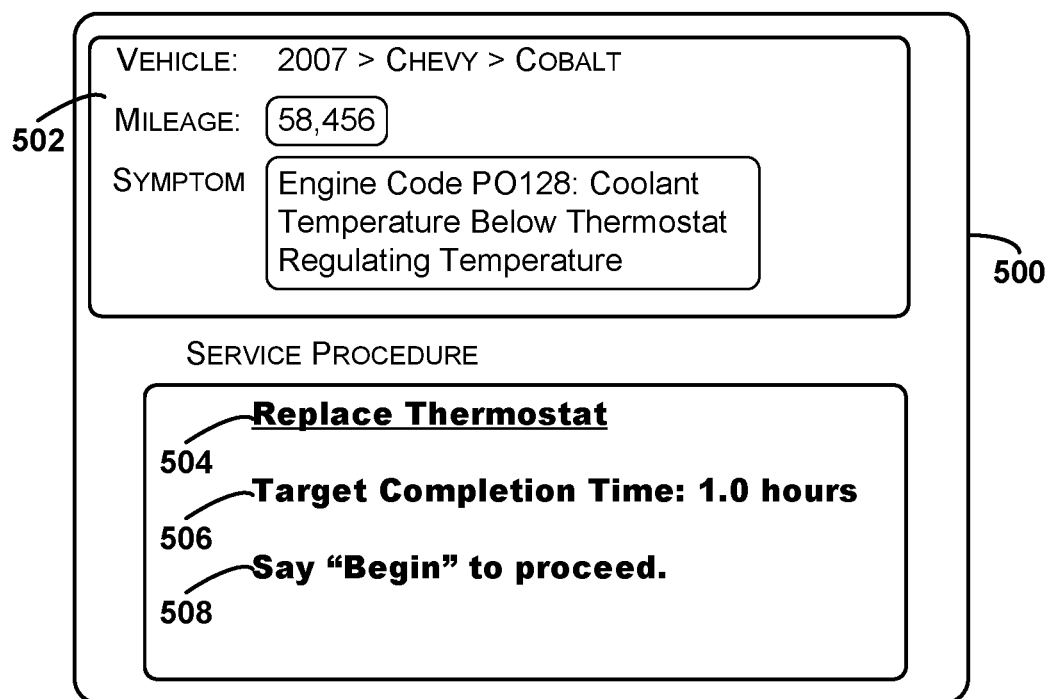
FIGS. 5A, 5B, 5C, 5D, and 5E are conceptual illustrations of a display interface of a computing device that displays a pace indicator, according to an example embodiment.

In reference to FIG. 5A, an example display interface 500 is illustrated for a computing device. A technician can specify certain vehicle information 502 via the display interface 500, which may be used to determine a vehicle service procedure to service a particular vehicle. By way of example, the interface 500 displays vehicle information 502 that includes a vehicle identifier (2007 Chevy Cobalt), mileage (58,456), and a symptom (Engine Code PO128: Coolant Temperature Below Thermostat Regulating Temperature). In other examples, some or all of vehicle information 502 may be determined automatically by a computing device (e.g., by receiving identifying information and/or diagnostic codes directly from the vehicle).

In addition to identifying the service procedure as thermostat replacement 504, the display interface 500 may display a target amount of time 506 to complete the procedure, shown here as 1.0 hours. In some examples, the target amount of time 506 may be determined based on past completion times of the thermostat replacement procedure on other vehicles. The past completion times used to determine the amount of time 506 may be restricted to particular types of vehicles (e.g., YMME slices), locations (e.g., one or more repair shops or geographical regions), and/or time periods. The target completion time 506 may be determined by averaging together or otherwise combining the past completion times.

The display interface 500 may additionally contain an instruction 508 that allows a technician to give a vocal command ("Begin") to start the procedure. In other examples, the first step of the procedure may automatically be displayed when the device recognizes a start signal indicating that a technician has started the procedure. For instance, the device may be an HMD which receives video data of the vehicle. When the video data indicates that the procedure has begun, the display interface 500 may display the first step of the procedure. The start signal may also be used to start a timer indicating an amount of elapsed time or an amount of time remaining from the target completion time 506.

Figure 5B:
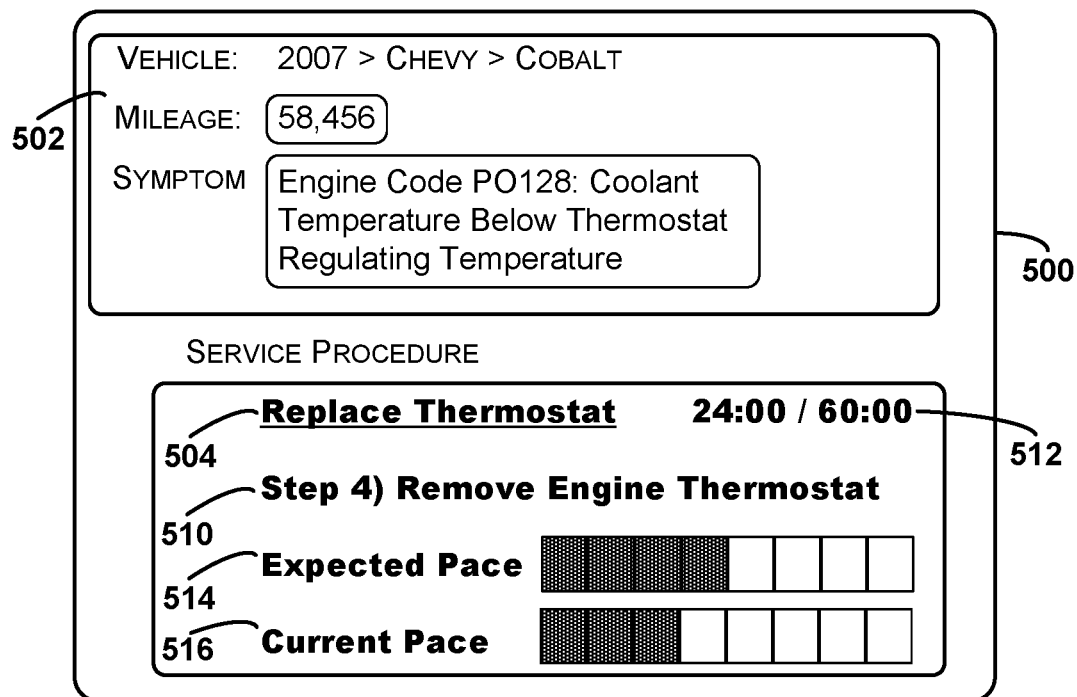

FIG. 5B illustrates the display interface 500 at a particular time during performance of the thermostat replacement procedure 504, according to an example embodiment. The display interface 500 shows the current step 510 being performed by the technician, in this case to remove the engine thermostat. The display 500 additionally shows an amount of elapsed time 512 (in this case, 24:00) counting up to the target completion time (in this case, 60 minutes). The amount of elapsed time provides a technician with an indication of how much time he has left in order to complete the procedure by the target completion time.

Additionally, an example pace indicator illustrating the expected pace 514 and the current pace 516 is shown within the display interface 500. The expected pace 514 is illustrated as a bar with the shaded squares indicating the number of steps of the procedure that the technician is expected to have completed by the current amount of elapsed time 512. In this case, the expected pace 514 indicates to the technician that four steps of the procedure should be complete in order to make the target completion time. The current pace 516 is illustrated as another bar with the shaded squares indicating the number of steps of the procedure that the technician has actually completed. In this case, the current pace 516 indicates that only three steps of the procedure have been completed. The pace indicator therefore provides a visual indicator to a technician that he is behind schedule. In another example, the pace indicator may list the expected current step (step 5) and the actual current step (step 4). In a further example, the pace indicator may simply indicate that the procedure is behind schedule (e.g., with the text "Behind Schedule" or a red light). The pace indicator may be presented in other ways as well.

Figure 5C:
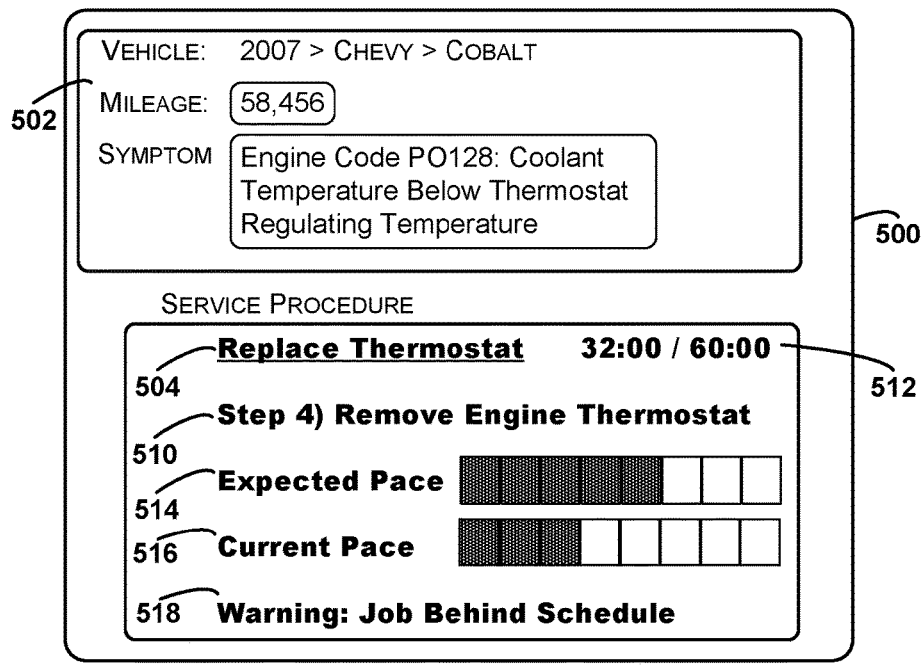

FIG. 5C illustrates the display interface 500 at a later point in time during performance of the thermostat replacement procedure 504, according to an example embodiment. In this case, the display interface 500 shows that the current step 510 being performed by the technician is still step 4, to remove the engine thermostat. The amount of elapsed time 512 has increased to 32:00. Additionally, the pace indicator now shows that the technician is further behind schedule. In particular the expected pace 514 now shows that five steps of the procedure are expected to be complete, while the current pace 516 shows that only three steps have been completed. Additionally, a warning signal 518 may be provided indicating that the technician is running behind a pace estimated to complete the procedure by the target completion time.

Figure 5D:
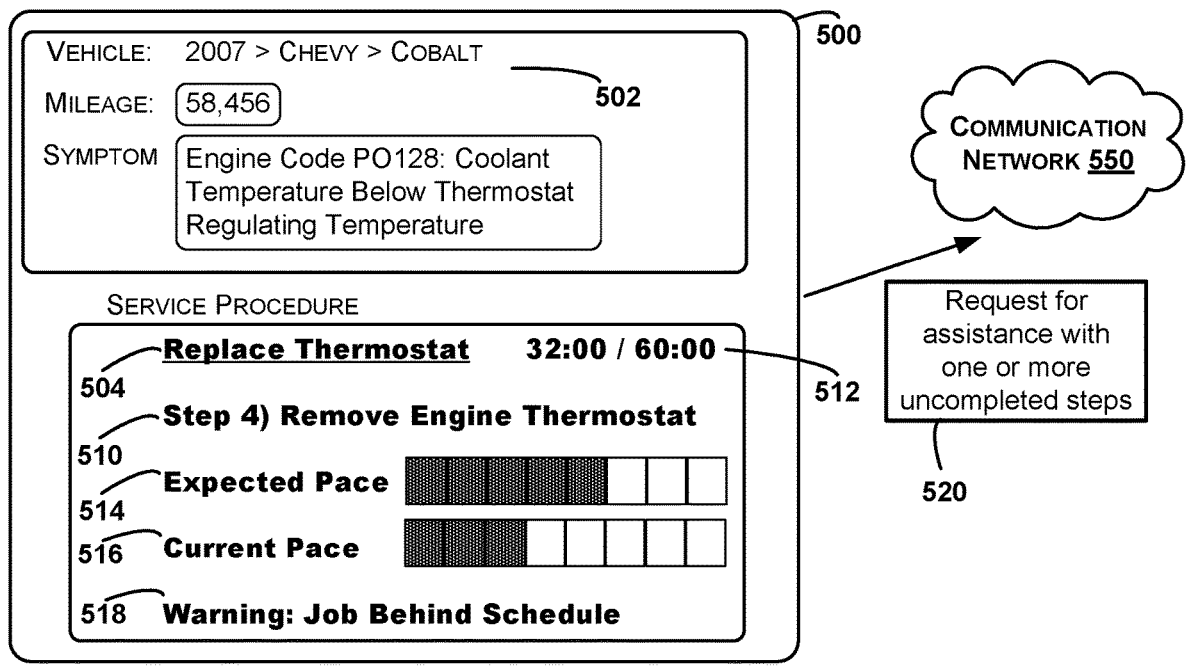

FIG. 5D illustrates a request for assistance sent by a computing device, according to an example embodiment. More specifically, a computing device with display interface 500 may autonomously send a request for assistance when the pace indicator indicates that a technician is behind schedule, as described with respect to FIG. 5C. In particular, a request for assistance with one or more uncompleted steps 520 may be sent via communication network 550 to a remote assistor. The request may ask for assistance with the current step, future steps, or both.

In some cases, the request may be sent to a server that provides supplemental service information to assist in the performance of procedural steps. In other cases, certain pieces of supplemental information that may be provided as hints or tips may already be stored on the computing device, and may be retrieved for display when a technician is behind schedule. In further examples, a request for assistance may be sent to a community of technicians, or specifically to technicians who have recently performed the same procedure. Such a request may involve sharing information to or from a remote assistor as a video feed, an audio feed, or in a different manner.

Figure 5E:
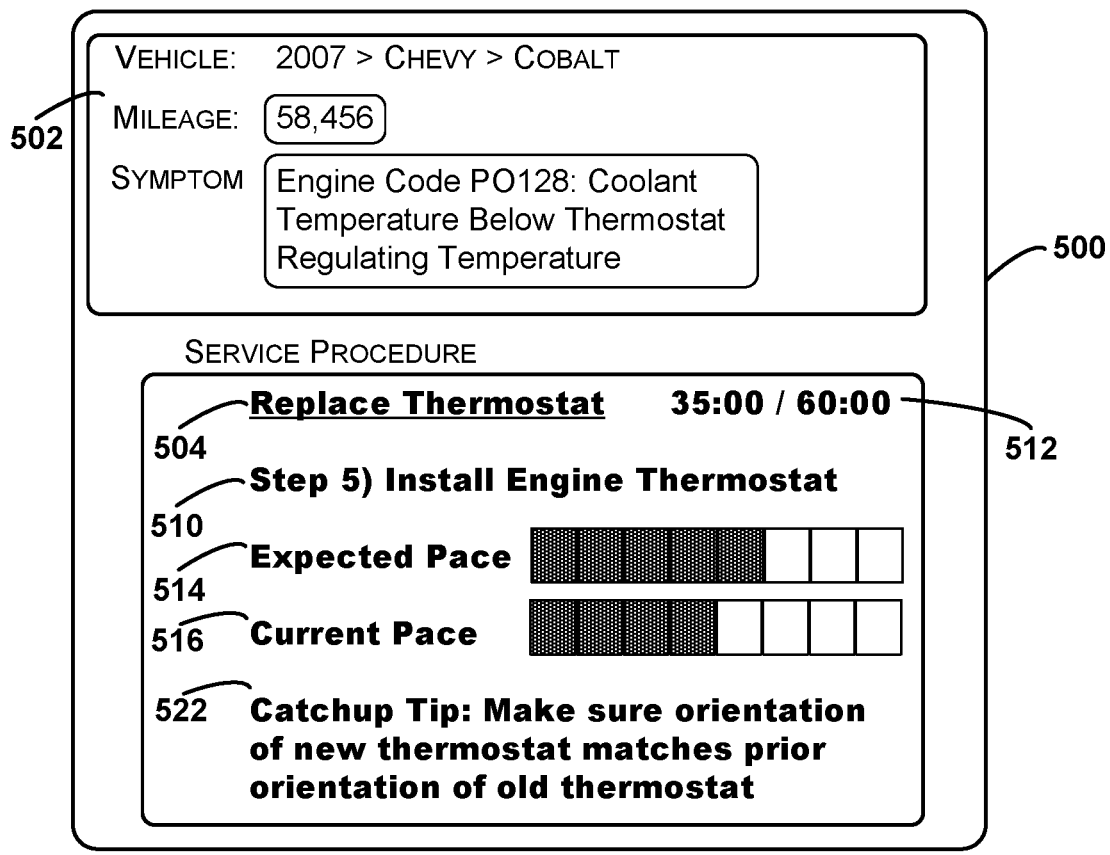

FIG. 5E illustrates the display interface 500 at another point in time during performance of the thermostat replacement procedure 504, according to an example embodiment. In this case, the display interface 500 shows that the current step 510 being performed by the technician is now step 5, to install a new engine thermostat. The amount of elapsed time 512 has increased to 35:00. The pace indicator now shows that the technician has started to catch up to the expected pace. In particular the expected pace 514 shows that five steps of the procedure are expected to be complete, while the current pace 516 now shows that four steps have been completed.

Additionally, a catchup tip 522 may be provided via display interface 500. In this case, the tip 522 indicates to make sure that the orientation of the new thermostat matches the prior orientation of the old thermostat when performing step 5. In some examples, the tip 522 may have been received in response the request for assistance illustrated and described with respect to FIG. 5D. In other examples, the tip 522 may be retrieved from a memory location within the computing device itself.

Figure 6A:
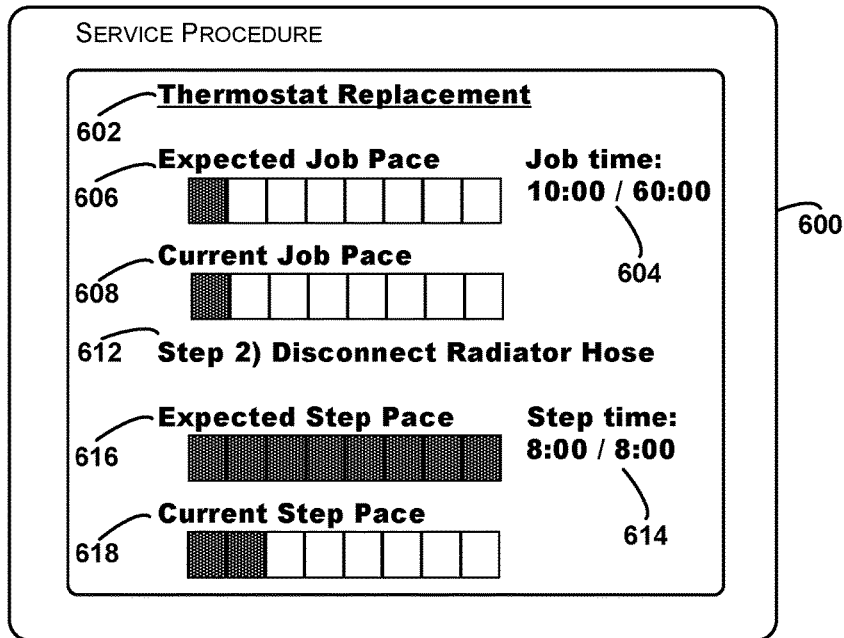
FIGS. 6A, 6B, and 6C are conceptual illustrations of a display interface of a computing device that displays a job pace indicator and a step pace indicator, according to an example embodiment.

FIG. 6A illustrates a display interface that shows a pace indicator both for an entire procedure and for a current procedural step, according to an example embodiment. More specifically, a display interface 600 may show a current amount of elapsed time 604 for procedure 602. The display interface 600 may additionally show an expected job pace 606 and a current job pace 608. In this case, the expected job pace 606 indicates that the first step of the procedure 602 is expected to be complete and the current job pace 608 indicates that the first step of the procedure 602 has been completed. Accordingly, the procedure as a whole is on schedule.

In addition, the display interface 600 may also show separate pace information for the current step 612 of the procedure 602 (in this case, step 2, to disconnect the radiator hose). In particular, the display interface 600 may display a separate elapsed amount of time 614 (in this case, eight minutes) from a target completion time (in this case, eight minutes) for the current procedural step 612 in addition to the elapsed amount of time 604 for the full procedure. The display interface 600 may additionally display a pace indicator for the current step 612, including an expected step pace 616 and a current step pace 618.

The expected step pace 616 may include target completion times for individual sub-steps of a procedural step. For instance, removing a radiator hose may involve removing several clamps at both ends of the hose. In this case, removal of each clamp may be a separate sub-step that is assigned a portion of the target completion time for the step 612. Additionally, the current step pace 618 may include actual completion times for individual sub-steps, which may be determined based on input signals such as video data. In this case, the expected step pace 616 may show that the step 612 is expected to be fully complete, but the current step pace 618 may indicate that only a portion of the step 612 has been completed. A pace indicator may therefore illustrate graphically that performance of the current step is behind schedule, although performance of the entire procedure is still on schedule.

Figure 6B:
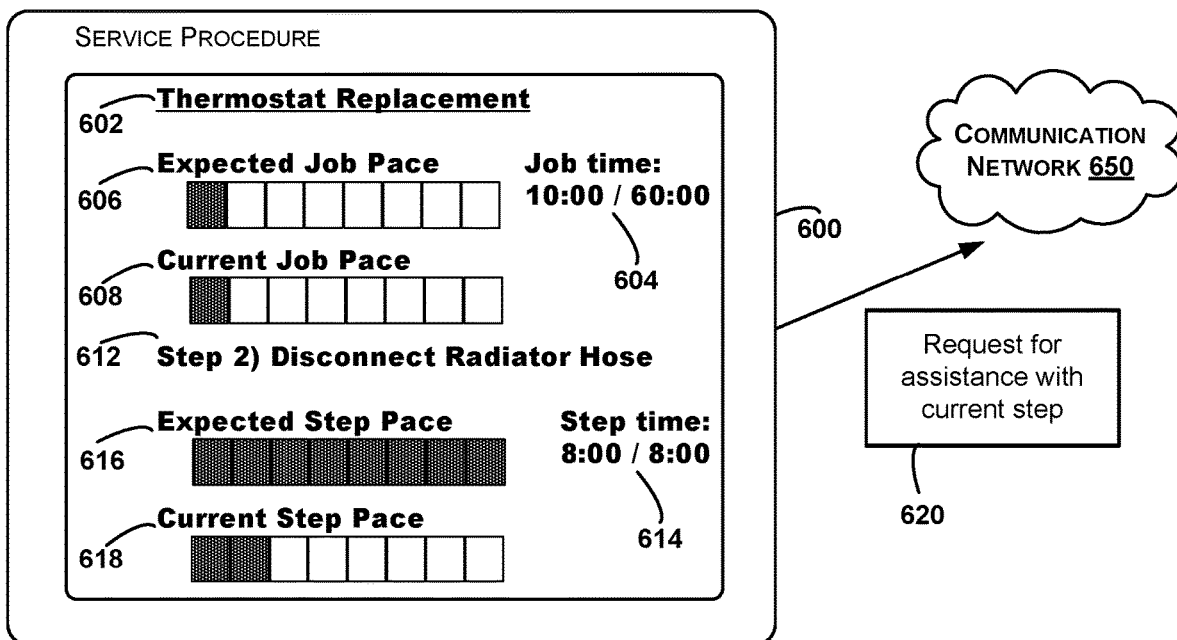

FIG. 6B illustrates a request for assistance with a current step sent by a computing device, according to an example embodiment. More specifically, a computing device with display interface 600 may autonomously send a request for assistance when the expected completion time for the current step has been exceeded and/or the pace indicator indicates that the current step is behind schedule, as described with respect to FIG. 6A. In particular, a request for assistance with the current step 620 may be sent via communication network 650 to a remote assistor.

In some examples, a request for assistance may be sent to a community of technicians, or specifically to technicians who have recently performed the same procedure and/or the same procedural step. For instance, a response to the request may indicate where to disconnect the radiator hose, or a particular type of tool to use in order to efficiently disconnect the radiator hose. In additional examples, the request may be sent to a server that provides supplemental service information to assist in the performance of procedural steps. In further examples, hints or tips may already be stored on the computing device, and may be retrieved for display when a technician is behind schedule.

Figure 6C:
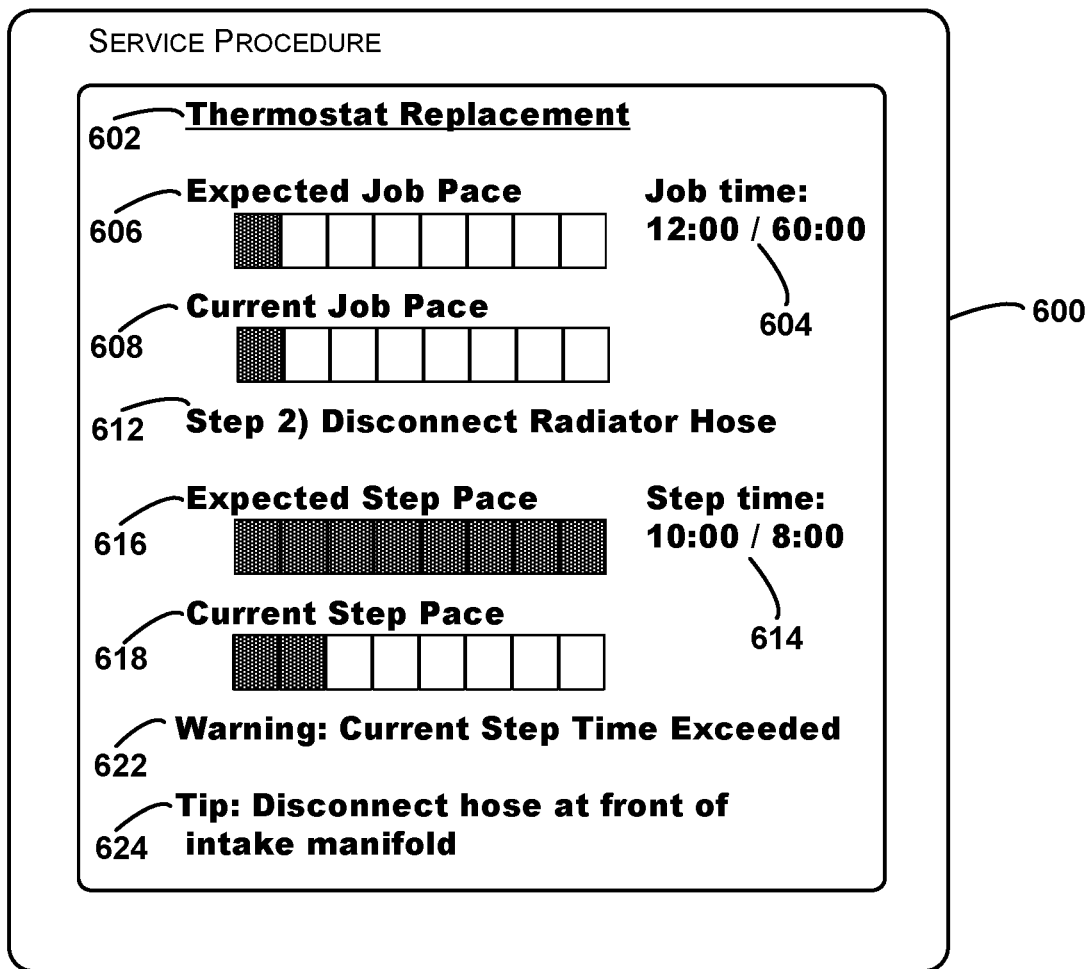

FIG. 6C illustrates the display interface 600 at another point in time during performance of the thermostat replacement procedure 602, according to an example embodiment. In this case, the display interface 600 shows that the current step 612 being performed by the technician is still step 2, to disconnect the radiator hose. The amount of elapsed time 604 for the job has increased to 12:00, and the amount of elapsed time 614 for the step has increased to 10:00.

In this case, a warning signal 622 may be provided to indicate that the current step time has been exceeded. Additionally, a tip 624 related to the current step 612 may be provided via display interface 600. In this case, the tip 624 indicates to disconnect the hose at the front of the intake manifold when performing step 2. In some examples, the tip 624 may have been received in response the request for assistance illustrated and described with respect to FIG. 6B. In other examples, the tip 624 may be retrieved from a memory location within the computing device itself.

Figure 7A:
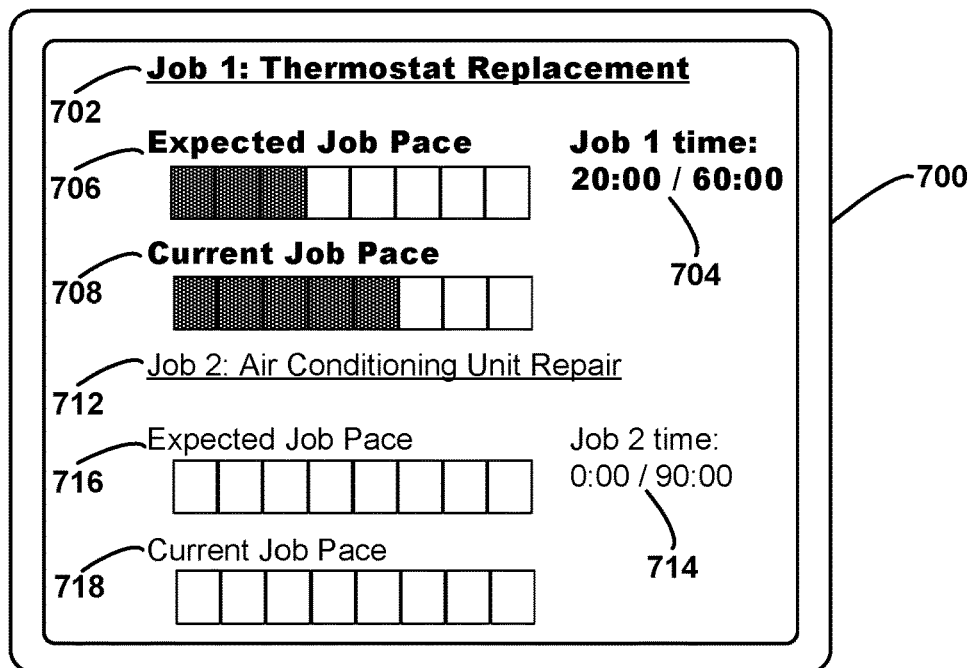
FIGS. 7A, 7B, and 7C are conceptual illustrations of a display interface of a computing device that displays multiple job pace indicators, according to an example embodiment.

FIG. 7A illustrates a display interface that shows pace indicators for multiple different procedures, according to an example embodiment. More specifically, a computing device may keep track of multiple timers and pace indicators for different procedures, allowing a technician to switch back and forth between procedures. This type of system may be beneficial when technicians perform multiple jobs in parallel. For instance, a technician may perform several steps of a first job and then reach a point where he needs to wait for customer approval. While waiting for customer approval, the technician may start a second job. Within examples, separate timers for each job may be provided to help keep the technician on pace with each of the jobs.

In reference to FIG. 7A, a display interface 700 may illustrate a first procedure 702 and a second procedure 712. A technician may be switching back and forth between the two procedures. A first amount of elapsed time 704 (in this case, 20:00) may indicate the amount of time spent performing the first procedure 702 relative to a target completion time for the first procedure 702 (in this case, 60:00). Additionally, a second amount of elapsed time 714 (in this case, 0:00) may indicate the amount of time spent performing the second procedure 712 relative to a target completion time for the second procedure 712 (in this case, 90:00).

In addition, a separate pace indicator may be provided for both procedure 702 and procedure 712. In particular, an expected job pace 706 and current job pace 708 for procedure 702 may indicate that performance of the first procedure 702 is ahead of schedule. Additionally, an expected job pace 716 and a current job pace 718 for procedure 712 may show that performance of the second procedure 712 has not yet been started.

When multiple procedures are performed in parallel, a particular procedure may be selected via user interface 700. For instance, in FIG. 7A, the first procedure 702 is shown in bold, indicating that it is selected. The selected procedure may be the procedure currently being performed by a technician. When the first procedure 702 is selected, the amount of elapsed time 704 for the first procedure 702 may be incremented, and the expected job pace 706 may also progress as the current amount of elapsed time 704 increases. The current job pace 708 for the first procedure 702 may also continue to progress as more steps of the procedure 702 are completed by the technician.

Meanwhile, the amount of elapsed time 714 and the expected job pace 716 and current job pace 718 for the second procedure 712 may not change as long as the first procedure 702 is selected. A different procedure can be selected in a number of different ways. In some examples, a particular user input (e.g., touching the second procedure on a touchpad or issuing a voice command to switch to the second procedure) may stop the clock for the first procedure 702 and start the clock for the second procedure 712. In other examples, the current procedure may be selected automatically based on one or more types of input data. For instance, video data from a camera on an HMD may be used to determine the current procedure being performed. The current procedure may then automatically be selected within the display interface 700.

Figure 7B:
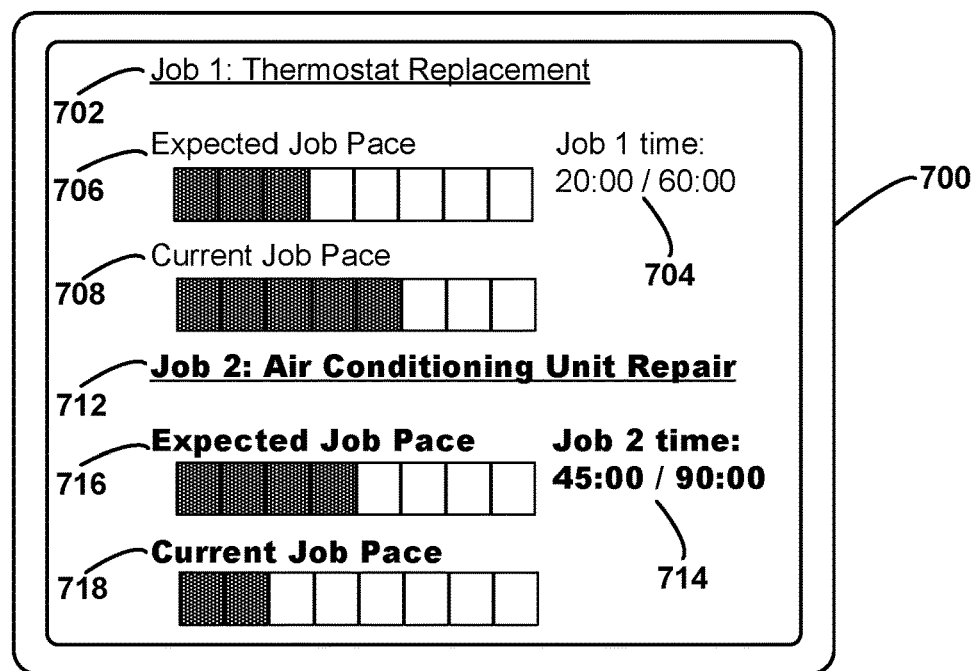

FIG. 7B illustrates the display interface from FIG. 7A with a different active procedure, according to an example embodiment. More specifically, the second procedure 712 may now be selected. For instance, a technician may have actively selected the second procedure 712 or the computing device may have automatically determined that the second procedure 712 has been started. In this case, the amount of time elapsed 704 for the first procedure 702 may be paused and recorded. The expected job pace 706 and current job pace 708 for the first procedure 702 may also be paused. Instead, the amount of elapsed time 714 for the second procedure 712 may tick up and the expected job pace 716 and current job pace 718 may advance during performance of the second procedure 712.

The display interface 700 illustrated in FIG. 7B may therefore simultaneously indicate to a technician that he is ahead of schedule on the first procedure 702 and behind schedule on the second procedure 712. By seeing the status of multiple procedures at once, the technician may be able to better plan out his schedule in order to complete an expected number of procedures within a certain period of time, such as a day or a week. In some examples, a technician may also be able to review jobs completed in the past, or possibly viewed in the context of other technicians to see how efficient his performance was.

Figure 7C:
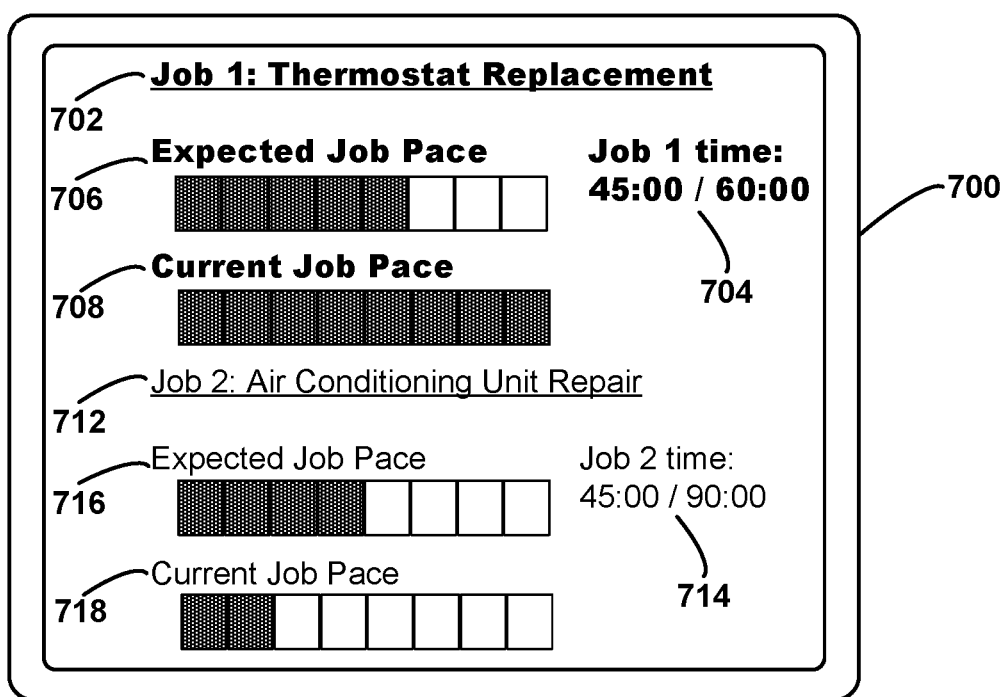

In reference to FIG. 7C, the first procedure 702 may again be selected (e.g., by user input or autonomous detection). The amount of time elapsed 714 for the second procedure 712 and the expected job pace 716 and current job pace 718 for the second procedure 712 may now be paused. The amount of elapsed time 704 may now resume ticking up from the point where it was paused and the expected job pace 706 and current job pace 708 may also continue to advance from the points they were at when performance of the first procedure 702 was previously halted.

In further examples, after a procedure has started, time during which the technician is not working on the procedure may be identified and used to adjust the expected pace for the procedure. For instance, if the technician takes a ten minute break or spends ten minutes working on a different job, the expected pace may be paused during that time or reset ten minutes to accommodate the break in performance. In some examples, this process may involve identifying a stop signal and a restart signal for the job, either based on user input or automatically. The expected pace may then be adjusted based on the time elapsed between a stop time when the stop signal was received and a restart time when the restart signal was received. For instance, if a procedure has a target completion time of 5:00 P.M. and a ten minute break in performance is identified, the expected pace of performance may be adjusted in order to reach an adjusted target completion time of 5:10 P.M.

In some cases, a stop in performance of a particular service procedure and a restart in performance of the particular service procedure may be identified based on video data. For instance, video data from a camera on a computing device used by a technician may be used to identify when the procedure is being performed and when the procedure is not being performed. In some examples, video data may be used to determine when a particular vehicle part is being serviced (e.g., for a transmission job, detecting removal or insertion of bolts from a transmission bell housing). In a further example, video data may be used to determine a percentage of time spent performing the first service procedure. For instance, if the video data indicates that the procedure was only performed 50% of the time during an hour, then the expected pace of performance may only be advanced as if half an hour had elapsed.

In further examples, the percentage of time that video data from a camera on a computing device such as an HMD represents a vehicle or vehicle part may be used as a proxy for indicating whether a technician is actively working on a job. In some cases, if the percentage is below an expected percentage of time, a warning signal may be presented to the technician. For instance, the warning signal may indicate that productivity can be improved by spending more time focused on the vehicle or vehicle parts.

Figure 8A:
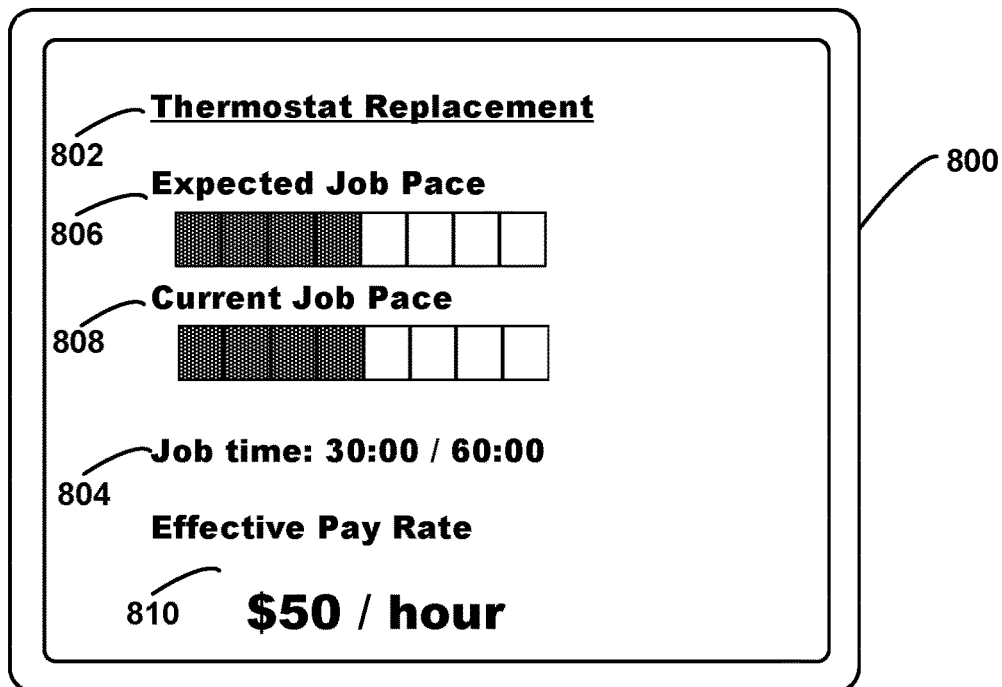
FIGS. 8A and 8B are conceptual illustrations of a display interface of a computing device that displays an effective pay rate, according to an example embodiment.
Figure 8B:
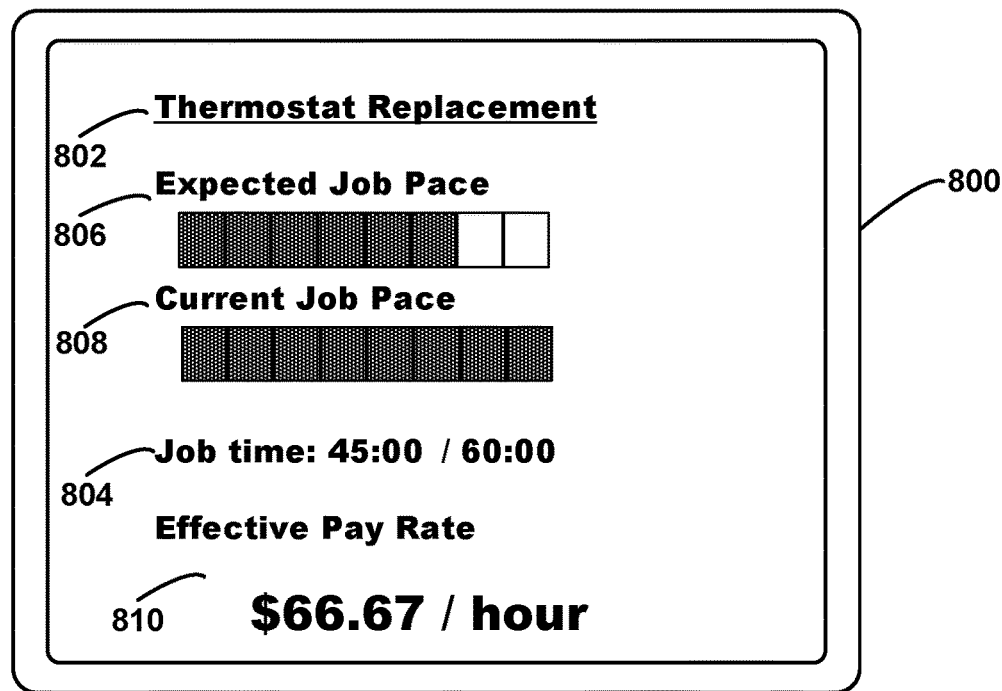

FIGS. 8A and 8B illustrate a display interface that shows an effective pay rate for a service procedure, according to an example embodiment. More specifically, an effective pay rate may show an amount of money per hour or per job that a technician is effectively getting paid based on the current rate of performance. In particular, an effective pay rate may be calculated as a base pay rate that is adjusted based on the current pace of performance relative to the expected pace of performance. Such adjustment may involve multiplying the base pay rate by a multiplier determined based on the current rate of performance relative to the expected rate of performance, or it may be calculated in a different manner.

FIG. 8A shows a display interface 800 that shows an amount of elapsed time 804 for a service procedure 802. The display interface 800 also shows an expected job pace 806 and a current job pace 808, which may be determined as described previously. As illustrated, a technician may be expected to have completed the first half of a procedure after thirty minutes have elapsed. In this case, the technician may have actually completed half the steps of the procedure as well. Accordingly, the technician may be on pace to complete the procedure by the target completion time. Assuming the job has a base pay rate of 50 dollars per hour, the effective pay rate 810 may also be reported as 50 dollars per hour. If the technician were behind schedule, the effective pay rate may be displayed as an amount less than 50 dollars per hour. If the technician where ahead of schedule, the effective pay rate may be displayed as an amount greater than 50 dollars per hour.

FIG. 8B shows the display interface of FIG. 8A at a later point in time. In particular, at an elapsed time 808 of 45 minutes, the technician may have completed the job. Accordingly, the current job pace 808 indicates that the job is completed, while the expected job pace 806 indicates that the job was only expected to be 75% complete at the current time. The technician is therefore ahead of schedule for procedure 802, which may be reflected by an increased effective pay rate 810 of 66.67 dollars per hour.

In some examples, the effective pay rate may be computed by multiplying a base pay rate by a ratio of expected job time to actual job time (e.g., $50/hour×60/45=$66.67/hour). In other examples, the effective pay rate may be computed by multiplying a base pay rate by a ratio of the expected number of steps completed at the current time to the actual number of steps completed at the current time (e.g., $50/hour×8/6=$66.67/hour). In further examples, the effective pay rate may be computed by adding the base rate to the base rate multiplied by an amount of time that the job is currently behind schedule or ahead of schedule (e.g., $50/hour+($50/hour×0.25 hour)=$62.50/hour). An effective pay rate may be computed in other manners that adjust a base pay rate based on the current pace relative to an expected pace as well.

In additional examples, a pace indicator may be made accessible to one or more additional parties during the performance of a vehicle service procedure. For example, a service writer may be provided with a separate display interface that shows pace indicators for a particular technician or multiple technicians within a shop. Such an interface may be updated based on messages received from diagnostic devices during the performance of service procedures. A service writer may therefore monitor the progress of one or more technicians as they proceed through the steps of one or more vehicle service procedures. In another example, a pace indicator may be displayed to a customer who owns a particular vehicle being serviced indicating the progress of a service procedure being performed on the particular vehicle. Such pace indicators provided to service writers and/or customers may be provided in various forms, including alerts indicating, for example, when a procedure has been started, when a procedure is behind schedule, when a procedure is ahead of schedule, or when a procedure is about to be completed.

Within examples, a computing device may record an amount of time spent by a technician in performing a service procedure and/or respective amounts of time to complete particular procedural steps. In some examples, timing information may only be recorded after receiving user approval. In further examples, the recorded time(s) may be transmitted to and stored in a database, and used to determine expected time(s) to complete the procedure or individual procedural steps on other vehicles in the future.

In further examples, gamification techniques may be applied as part of a display interface to provide feedback to technicians or to motivate technicians to hit target completion times. For instance, an indication of a technician's current pace relative to the shop average on a given service procedure may be displayed. In another example, a technician's performance times on service procedures over a given time interval (e.g., the current day, current week, or current month) may be aggregated and compared to the shop average or other technicians within the shop. For instance, a "top tech" or "best in shop" indicator may be displayed on the display interface of a technician with the fastest completion times in a given day. In a further example, a leader board may be displayed that provides a current ranking of technicians based on performance times over a given time interval, such as the prior week. Such a leader board may be updated periodically as procedures are completed, or as individual steps of procedures are completed. Other types of game principles and game design elements may also be employed as part of a job pacing display interface as well.

Figure 9:
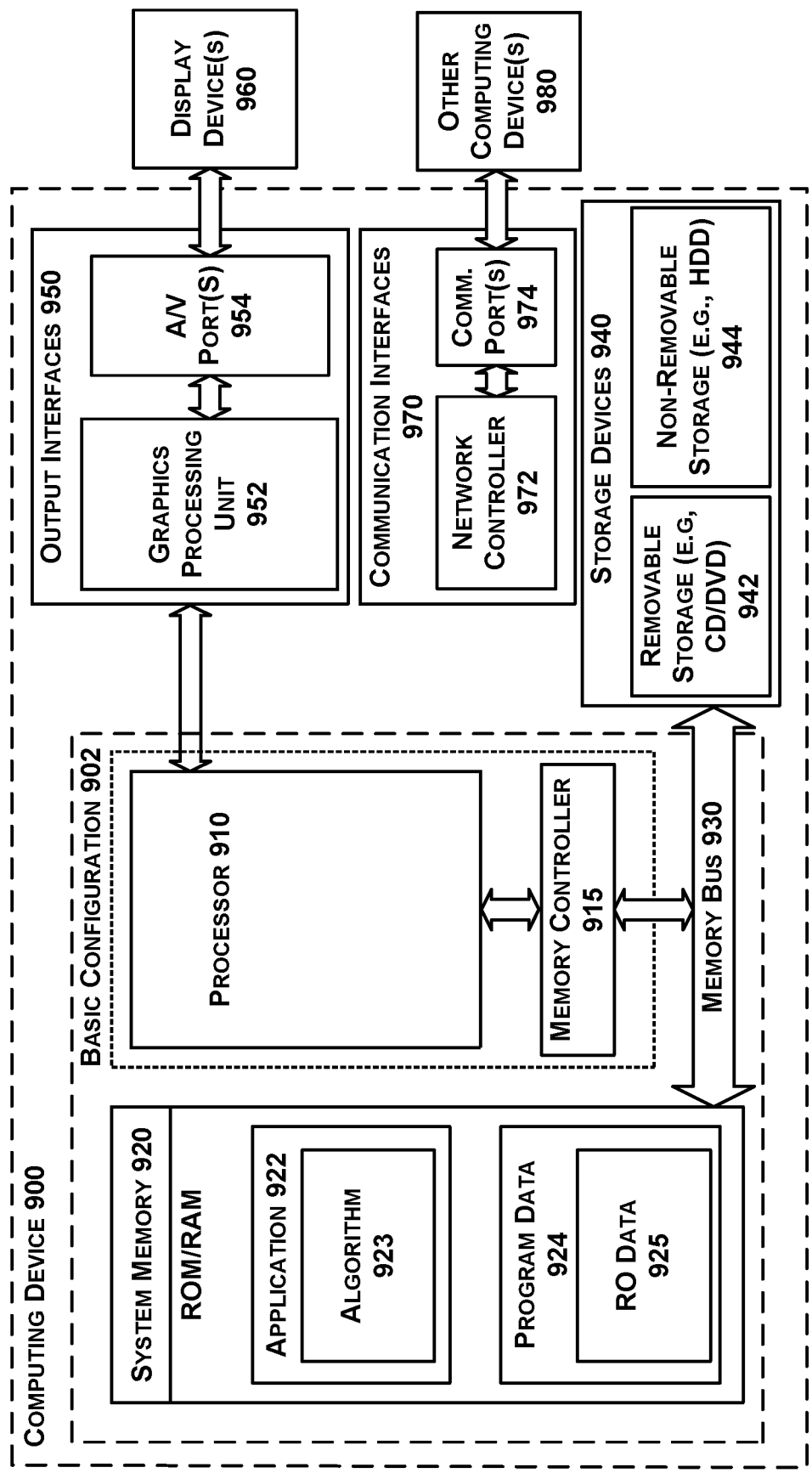
FIG. 9 is a functional block diagram illustrating a computing device used in a computing system that is arranged in accordance with at least some embodiments described herein, according to an example embodiment.

As described above, the computing devices described herein can be any of a number of different types of computing devices. FIG. 9 is a functional block diagram illustrating an example computing device 900 used in a computing system that is arranged in accordance with at least some embodiments described herein. The computing device 900 can be implemented to determine estimate information or perform any of the functions described above with reference to FIGS. 1-8. In a basic configuration 902, computing device 900 can typically include one or more processors 910 and system memory 920. A memory bus 930 can be used for communicating between the processor 910 and the system memory 920. Depending on the desired configuration, processor 910 can be of any type including but not limited to a microprocessor (μP), a microcontroller (μC), a digital signal processor (DSP), or any combination thereof.

A memory controller 915 can also be used with the processor 910, or in some implementations, the memory controller 915 can be an internal part of the processor 910.

Depending on the desired configuration, the system memory 920 can be of any type including but not limited to volatile memory (such as RAM), non-volatile memory (such as ROM, flash memory, etc.) or any combination thereof. System memory 920 can include one or more applications 922, and program data 924. Application 922 can include an algorithm 923 that is arranged to receive vehicle information and provide the vehicle information to a communication network or receive vehicle information and determine estimate information, in accordance with the present disclosure. Program data 924 can include repair order data 925 that could be directed to any number of types of data. In some example embodiments, application 922 can be arranged to operate with program data 924 on an operating system.

Computing device 900 can have additional features or functionality, and additional interfaces to facilitate communications between the basic configuration 902 and any devices and interfaces. For example, data storage devices 940 can be provided including removable storage devices 942, non-removable storage devices 944, or a combination thereof. Examples of removable storage and non-removable storage devices include magnetic disk devices such as flexible disk drives and hard-disk drives (HDD), optical disk drives such as compact disc (CD) drives or digital versatile disk (DVD) drives, solid state drives (SSD), and tape drives to name a few. Computer storage media can include volatile and nonvolatile, non-transitory, removable and non-removable media implemented in any method or technology for storage of information, such as computer-readable instructions, data structures, program modules, or other data.

System memory 920 and storage devices 940 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 900. Any such computer storage media can be part of device 900.

Figure 10:
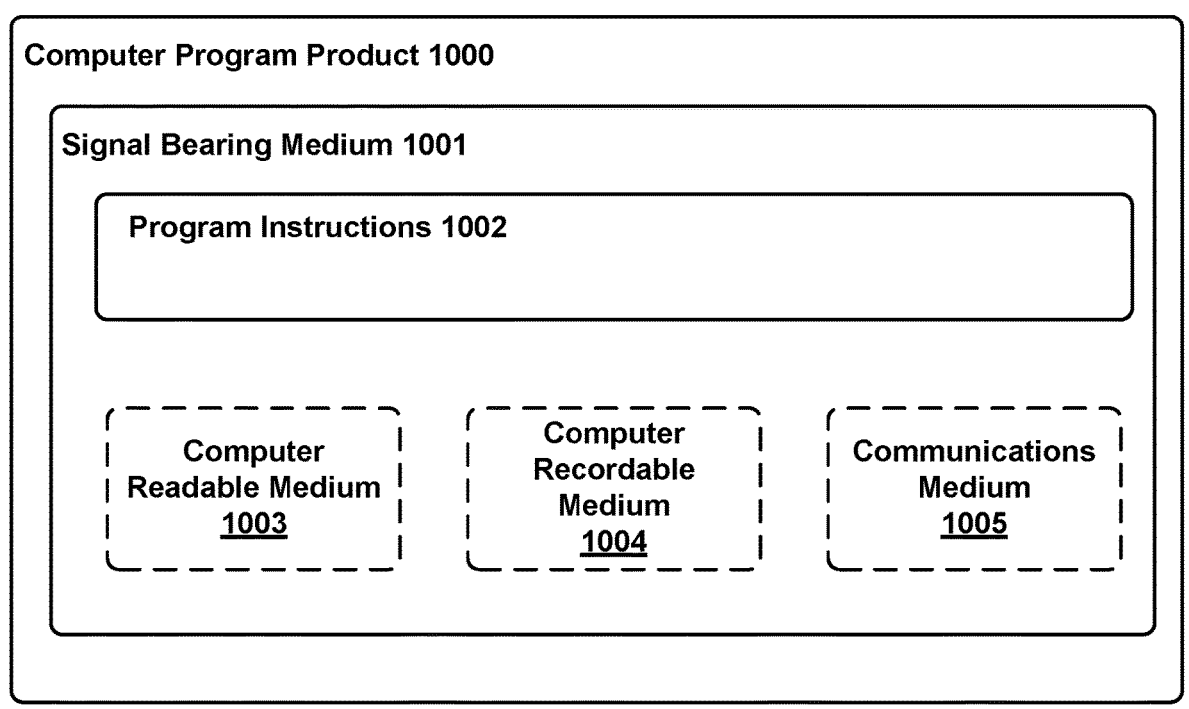
FIG. 10 is a schematic illustrating a conceptual partial view of a computer program product that includes a computer program for executing a computer process on a computing device, according to an example embodiment.

Computing device 900 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 900 can also be implemented as a personal computer, including both laptop computer and non-laptop computer configurations, or a server. In some embodiments, the disclosed methods can be implemented as computer program instructions encoded on a non-transitory computer-readable storage media in a machine-readable format, or on other non-transitory media or articles of manufacture. FIG. 10 is a schematic illustrating a conceptual partial view of an example computer program product 1000 that includes a computer program for executing a computer process on a computing device, arranged according to at least some embodiments presented herein.

Computing device 900 can also include output interfaces 950 that can include a graphics processing unit 952, which can be configured to communicate to various external devices such as display devices 960 or speakers via one or more A/V ports 954 or a communication interface 970. The communication interface 970 can include a network controller 972, which can be arranged to facilitate communications with one or more other computing devices 980 over a network communication via one or more communication ports 974. The communication connection is one example of a communication media. Communication media can be embodied by computer-readable instructions, data structures, program modules, or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media.

In one embodiment, the example computer program product 1000 is provided using a signal bearing medium 1001. The signal bearing medium 1001 can include one or more programming instructions 1002 that, when executed by one or more processors can provide functionality or portions of the functionality described above with respect to FIGS. 1-9. In some examples, the signal bearing medium 1001 can encompass a computer-readable medium 1003, such as, but not limited to, a hard disk drive, a Compact Disc (CD), a Digital Video Disk (DVD), a digital tape, memory, etc. In some implementations, the signal bearing medium 1001 can encompass a computer recordable medium 1004, such as, but not limited to, memory, read/write (R/W) CDs, R/W DVDs, etc. In some implementations, the signal bearing medium 1001 can encompass a communications medium 1005, such as, but not limited to, a digital and/or an analog communication medium (e.g., a fiber optic cable, a waveguide, a wired communications link, a wireless communication link, etc.). Thus, for example, the signal bearing medium 1001 can be conveyed by a wireless form of the communications medium 1005 (e.g., a wireless communications medium conforming to the Institute of Electrical and Electronics Engineers (IEEE) 802.11 standard or another transmission protocol).

The one or more programming instructions 1002 can be, for example, computer executable and/or logic implemented instructions. In some examples, a computing device such as the computing device 900 of FIG. 9 can be configured to provide various operations, functions, or actions in response to the programming instructions 1002 conveyed to the computing device 900 by one or more of the computer-readable medium 1003, the computer recordable medium 1004, and/or the communications medium 1005.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements can be omitted altogether according to the desired results. Further, many of the elements that are described are functional entities that can be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

Embodiments of the present disclosure may thus relate to one of the enumerated example embodiments (EEEs) listed below.

EEE 1 is a method comprising: receiving, by a computing device, a first service procedure for servicing a vehicle; determining an expected pace of performance of the first service procedure, wherein the expected pace of performance comprises a plurality of expected completion times of a plurality of steps of the first service procedure to complete the first service procedure by a target completion time; receiving, by the computing device, at least one input signal during performance of the first service procedure; determining, based on the at least one input signal, a current pace of performance of the first service procedure, wherein the current pace of performance of the first service procedure comprises one or more actual completion times of one or more steps of the plurality of steps of the first service procedure; and providing for display of a first pace indicator on a display interface of the computing device, wherein the first pace indicator is representative of the current pace of performance of the first service procedure relative to the expected pace of performance of the first service procedure.

EEE 2 is the method of EEE 1, further comprising: receiving, by the computing device, a start signal at a start time, wherein the start signal indicates that the first service procedure has been started; and determining the one or more actual completion times of the one or more steps relative to the start time.

EEE 3 is the method of EEE 1 or 2, further comprising: receiving, by the computing device, a stop signal indicating that performance of the first service procedure has stopped; receiving, by the computing device, a restart signal indicating that performance of the first service procedure has restarted; and adjusting the expected pace of performance of the first service procedure based on an amount of time elapsed between receiving the stop signal and the restart signal.

EEE 4 is the method of any one of EEE 1 to 3, wherein receiving the at least one input signal comprises receiving one or more audible input signals indicative of completion of the one or more steps.

EEE 5 is the method of any one of EEE 1 to 4, wherein receiving the at least one input signal comprises receiving video data from a camera coupled to the computing device, wherein at least a portion of the video data is indicative of the vehicle during performance of the first service procedure.

EEE 6 is the method of EEE 5, further comprising: identifying a stop in performance of the first service procedure at a stop time based on the video data; identifying a restart in performance of the first service procedure at a restart time based on the video data; and adjusting the expected pace of performance of the first service procedure based on an amount of time elapsed between the stop time and the restart time.

EEE 7 is the method of EEE 5 or 6, further comprising: determining a percentage of time spent performing the first service procedure on the vehicle based on the video data; and adjusting the expected pace of performance of the first service procedure based on the percentage of time spent performing the first service procedure on the vehicle.

EEE 8 is the method of any one of EEE 1 to 7, further comprising: determining an effective pay rate for the first service procedure, wherein the effective pay rate comprises a base pay rate that is adjusted based on the current pace of performance relative to the expected pace of performance; and providing for display of the effective pay rate on the display interface of the computing device.

EEE 9 is the method of any one of EEE 1 to 8, further comprising: receiving at least one target completion time for at least one step of the plurality of steps of the first service procedure; and determining the expected pace of performance of the first service procedure based on the at least one target completion time for the at least one step.

EEE 10 is the method of any one of EEE 1 to 9, further comprising: determining an expected pace of performance of a current step of the first service procedure to complete the current step by an expected completion time for the current step; and determining a current pace of performance of the current step of the first service procedure, wherein the first pace indicator is further representative of the current pace of performance of the current step of the first service procedure relative to the expected pace of performance of the current step of the first service procedure.

EEE 11 is the method of any one of EEE 1 to 10, further comprising: determining that an expected completion time for a current step of the first service procedure has been exceeded; transmitting a request for assistance with the current step; receiving at least one response to the request for assistance, wherein the at least one response comprises at least one piece of service information; and providing for display of the at least one piece of service information on the display interface of the computing device.

EEE 12 is the method of any one of EEE 1 to 11, further comprising: determining, based on the current pace of performance and the expected pace of performance, that performance of the first service procedure is behind schedule; in response to determining that performance of the first service procedure is behind schedule, transmitting a request for assistance with one or more uncompleted steps of the first service procedure; receiving at least one response to the request for assistance, wherein the at least one response comprises at least one piece of service information for at least one of the one or more uncompleted steps of the first service procedure; and providing for display of the at least one piece of service information on the display interface of the computing device.

EEE 13 is the method of any one of EEE 1 to 12, wherein the first pace indicator comprises an indication that performance of the first service procedure is one of behind schedule, on time, or ahead of schedule.

EEE 14 is the method of any one of EEE 1 to 13, wherein the first pace indicator comprises an indication of at least one of (i) an elapsed amount of time during performance of the first service procedure and (ii) an amount of time remaining from the target completion time.

EEE 15 is the method of any one of EEE 1 to 14, further comprising: determining that a second service procedure has been started; recording an amount of time elapsed during performance of the first service procedure; and providing for display of a second pace indicator on the display interface of the computing device, wherein the second pace indicator is representative of a current pace of performance of the second service procedure relative to an expected pace of performance of the second service procedure.

EEE 16 is the method of EEE 15, further comprising: receiving video data from a camera coupled to the computing device; and determining that the second service procedure has been started based on the received video data.

EEE 17 is the method of EEE 15 or 16, further comprising: determining that the first service procedure has been resumed; and determining the current pace of performance of the first service procedure based on the recorded amount of time elapsed during performance of the first service procedure.

EEE 18 is the method of EEE 17, further comprising: receiving, from a user interface of the computing device, a selection signal indicating a selection of the first pace indicator; and determining that the first service procedure has been resumed based on the selection signal.

EEE 19 is the method of any one of EEE 1 to 18, wherein determining the current pace of performance of the first service procedure comprises: providing, by the computing device, at least one query requesting confirmation that at least one of the one or more steps has been completed; receiving, by the computing device, at least one responsive input signal responsive to the at least one query; and determining the current pace of performance of the first service procedure based on the at least one responsive input signal.

EEE 20 is the method of any one of EEE 1 to 19, wherein the computing device comprises a head-mountable device with a camera, the method further comprising: receiving video data from the camera during performance of the first service procedure; and determining the current pace of performance of the first service procedure based at least in part on the received video data.

EEE 21 is the method of EEE 20, further comprising: determining a percentage of time that the video data represents at least one of a portion of the vehicle or a vehicle part; determining that the percentage of time is below an expected percentage of time; and in response to determining that the percentage of time is below an expected percentage of time, providing for display of a warning signal on the display interface.

EEE 22 is the method of any one of EEE 1 to 21, further comprising: receiving the plurality of expected completion times of the plurality of steps of the first service procedure from a first data source that includes past completion times of vehicle service procedure steps; and providing the one or more actual completion times of the one or more steps to the first data source.

EEE 23 is the method of any one of EEE 1 to 22, wherein the at least one input signal comprises at least one detected sound, the method further comprising: identifying, based on the at least one detected sound, at least one of the one or more actual completion times of the one or more steps of the first service procedure.

EEE 24 is the method of any one of EEE 1 to 22, wherein the at least one input signal comprises at least one detected sound, the method further comprising: identifying, based on at least one frequency of the at least one detected sound, at least one operation performed with a given tool during performance of the first service procedure; and determining at least one of the one or more actual completion times of the one or more steps of the first service procedure based on the at least one identified operation performed with the given tool.

EEE 25 is the method of EEE 24, wherein the at least one input signal further comprises video data indicative of the vehicle during performance of the first service procedure, the method further comprising: identifying, based on the video data, the given tool before identifying the at least one operation performed with the given tool.

EEE 26 is the method of any one of EEE 1 to 25, wherein the at least one input signal comprises sensor data received from at least one sensor coupled to at least one piece of vehicle service equipment used in performance of the first service procedure, the method further comprising: determining at least one of the one or more actual completion times of the one or more steps of the first service procedure based on the received sensor data.

EEE 27 is the method of EEE 26, wherein the sensor data is indicative of an amount of fluid dispensed by the at least one piece of vehicle service equipment, the method further comprising: determining the at least one actual completion time based on when the amount of fluid dispensed reaches a predetermined target amount for the vehicle.

EEE 28 is the method of EEE 26, wherein the sensor data is indicative of a number of operations performed on the vehicle with the at least one piece of vehicle service equipment, the method further comprising: determining the at least one actual completion time based on when the number of operations reaches an expected number for operations for the at least one piece of vehicle service equipment in performance of the first service procedure.

EEE 29 is a computing device comprising: a display interface; one or more processors; a non-transitory computer readable medium; and program instructions stored on the non-transitory computer readable medium and executable by the one or more processors to cause the computing device to perform functions comprising: receiving a first service procedure for servicing a vehicle; determining an expected pace of performance of the first service procedure, wherein the expected pace of performance comprises a plurality of expected completion times of a plurality of steps of the first service procedure to complete the first service procedure by a target completion time; receiving at least one input signal during performance of the first service procedure; determining, based on the at least one input signal, a current pace of performance of the first service procedure, wherein the current pace of performance of the first service procedure comprises one or more actual completion times of one or more steps of the plurality of steps of the first service procedure; and providing for display of a first pace indicator on the display interface, wherein the first pace indicator is representative of the current pace of performance of the first service procedure relative to the expected pace of performance of the first service procedure.

EEE 30 is the computing device of EEE 29, the functions further comprising: receiving, by the computing device, a start signal at a start time, wherein the start signal indicates that the first service procedure has been started; and determining the one or more actual completion times of the one or more steps relative to the start time.

EEE 31 is the computing device of EEE 29 or 30, the functions further comprising: receiving, by the computing device, a stop signal indicating that performance of the first service procedure has stopped; receiving, by the computing device, a restart signal indicating that performance of the first service procedure has restarted; and adjusting the expected pace of performance of the first service procedure based on an amount of time elapsed between receiving the stop signal and the restart signal.

EEE 32 is the computing device of any one of EEE 29 to 31, wherein receiving the at least one input signal comprises receiving one or more audible input signals indicative of completion of the one or more steps.

EEE 33 is the computing device of any one of EEE 29 to 32, wherein receiving the at least one input signal comprises receiving video data from a camera coupled to the computing device, wherein at least a portion of the video data is indicative of the vehicle during performance of the first service procedure.

EEE 34 is the computing device of EEE 33, the functions further comprising: identifying a stop in performance of the first service procedure at a stop time based on the video data; identifying a restart in performance of the first service procedure at a restart time based on the video data; and adjusting the expected pace of performance of the first service procedure based on an amount of time elapsed between the stop time and the restart time.

EEE 35 is the computing device of EEE 33 or 34, the functions further comprising: determining a percentage of time spent performing the first service procedure on the vehicle based on the video data; and adjusting the expected pace of performance of the first service procedure based on the percentage of time spent performing the first service procedure on the vehicle.

EEE 36 is the computing device of any one of EEE 29 to 35, the functions further comprising: determining an effective pay rate for the first service procedure, wherein the effective pay rate comprises a base pay rate that is adjusted based on the current pace of performance relative to the expected pace of performance; and providing for display of the effective pay rate on the display interface of the computing device.

EEE 37 is the computing device of any one of EEE 29 to 36, the functions further comprising: receiving at least one target completion time for at least one step of the plurality of steps of the first service procedure; and determining the expected pace of performance of the first service procedure based on the at least one target completion time for the at least one step.

EEE 38 is the computing device of any one of EEE 29 to 37, the functions further comprising: determining an expected pace of performance of a current step of the first service procedure to complete the current step by an expected completion time for the current step; and determining a current pace of performance of the current step of the first service procedure, wherein the first pace indicator is further representative of the current pace of performance of the current step of the first service procedure relative to the expected pace of performance of the current step of the first service procedure.

EEE 39 is the computing device of any one of EEE 29 to 38, the functions further comprising: determining that an expected completion time for a current step of the first service procedure has been exceeded; transmitting a request for assistance with the current step; receiving at least one response to the request for assistance, wherein the at least one response comprises at least one piece of service information; and providing for display of the at least one piece of service information on the display interface of the computing device.

EEE 40 is the computing device of any one of EEE 29 to 39, the functions further comprising: determining, based on the current pace of performance and the expected pace of performance, that performance of the first service procedure is behind schedule; in response to determining that performance of the first service procedure is behind schedule, transmitting a request for assistance with one or more uncompleted steps of the first service procedure; receiving at least one response to the request for assistance, wherein the at least one response comprises at least one piece of service information for at least one of the one or more uncompleted steps of the first service procedure; and providing for display of the at least one piece of service information on the display interface of the computing device.

EEE 41 is the computing device of any one of EEE 29 to 40, wherein the first pace indicator comprises an indication that performance of the first service procedure is one of behind schedule, on time, or ahead of schedule.

EEE 42 is the computing device of any one of EEE 29 to 41, wherein the first pace indicator comprises an indication of at least one of (i) an elapsed amount of time during performance of the first service procedure and (ii) an amount of time remaining from the target completion time.

EEE 43 is the computing device of any one of EEE 29 to 42, the functions further comprising: determining that a second service procedure has been started; recording an amount of time elapsed during performance of the first service procedure; and providing for display of a second pace indicator on the display interface of the computing device, wherein the second pace indicator is representative of a current pace of performance of the second service procedure relative to an expected pace of performance of the second service procedure.

EEE 44 is the computing device of EEE 43, the functions further comprising: receiving video data from a camera coupled to the computing device; and determining that the second service procedure has been started based on the received video data.

EEE 45 is the computing device of EEE 43 or 44, the functions further comprising: determining that the first service procedure has been resumed; and determining the current pace of performance of the first service procedure based on the recorded amount of time elapsed during performance of the first service procedure.

EEE 46 is the computing device of EEE 45, the functions further comprising: receiving, from a user interface of the computing device, a selection signal indicating a selection of the first pace indicator; and determining that the first service procedure has been resumed based on the selection signal.

EEE 47 is the computing device of any one of EEE 29 to 46, wherein determining the current pace of performance of the first service procedure comprises: providing, by the computing device, at least one query requesting confirmation that at least one of the one or more steps has been completed; receiving, by the computing device, at least one responsive input signal responsive to the at least one query; and determining the current pace of performance of the first service procedure based on the at least one responsive input signal.

EEE 48 is the computing device of any one of EEE 29 to 47, wherein the computing device comprises a head-mountable device with a camera, the functions further comprising: receiving video data from the camera during performance of the first service procedure; and determining the current pace of performance of the first service procedure based at least in part on the received video data.

EEE 49 is the computing device of EEE 48, the functions further comprising: determining a percentage of time that the video data represents at least one of a portion of the vehicle or a vehicle part; determining that the percentage of time is below an expected percentage of time; and in response to determining that the percentage of time is below an expected percentage of time, providing for display of a warning signal on the display interface.

EEE 50 is the computing device of any one of EEE 29 to 49, the functions further comprising: receiving the plurality of expected completion times of the plurality of steps of the first service procedure from a first data source that includes past completion times of vehicle service procedure steps; and providing the one or more actual completion times of the one or more steps to the first data source.

EEE 51 is the computing device of any one of EEE 29 to 50, wherein the at least one input signal comprises at least one detected sound, the functions further comprising: identifying, based on the at least one detected sound, at least one of the one or more actual completion times of the one or more steps of the first service procedure.

EEE 52 is the computing device of any one of EEE 29 to 50, wherein the at least one input signal comprises at least one detected sound, the functions further comprising: identifying, based on at least one frequency of the at least one detected sound, at least one operation performed with a given tool during performance of the first service procedure; and determining at least one of the one or more actual completion times of the one or more steps of the first service procedure based on the at least one identified operation performed with the given tool.

EEE 53 is the computing device of EEE 52, wherein the at least one input signal further comprises video data indicative of the vehicle during performance of the first service procedure, the functions further comprising: identifying, based on the video data, the given tool before identifying the at least one operation performed with the given tool.

EEE 54 is the computing device of any one of EEE 29 to 51, wherein the at least one input signal comprises sensor data received from at least one sensor coupled to at least one piece of vehicle service equipment used in performance of the first service procedure, the functions further comprising: determining at least one of the one or more actual completion times of the one or more steps of the first service procedure based on the received sensor data.

EEE 55 is the computing device of EEE 54, wherein the sensor data is indicative of an amount of fluid dispensed by the at least one piece of vehicle service equipment, the functions further comprising: determining the at least one actual completion time based on when the amount of fluid dispensed reaches a predetermined target amount for the vehicle.

EEE 56 is the computing device of EEE 54, wherein the sensor data is indicative of a number of operations performed on the vehicle with the at least one piece of vehicle service equipment, the functions further comprising: determining the at least one actual completion time based on when the number of operations reaches an expected number for operations for the at least one piece of vehicle service equipment in performance of the first service procedure.

EEE 57 is a non-transitory computer readable medium having stored therein instructions executable by one or more processors to cause a computing system to perform functions comprising: receiving a first service procedure for servicing a vehicle; determining an expected pace of performance of the first service procedure, wherein the expected pace of performance comprises a plurality of expected completion times of a plurality of steps of the first service procedure to complete the first service procedure by a target completion time; receiving at least one input signal during performance of the first service procedure; determining, based on the at least one input signal, a current pace of performance of the first service procedure, wherein the current pace of performance of the first service procedure comprises one or more actual completion times of one or more steps of the plurality of steps of the first service procedure; and providing for display of a first pace indicator on a display interface of a computing device, wherein the first pace indicator is representative of the current pace of performance of the first service procedure relative to the expected pace of performance of the first service procedure.

EEE 58 is the computer readable medium of EEE 57, the functions further comprising: receiving, by the computing device, a start signal at a start time, wherein the start signal indicates that the first service procedure has been started;

and determining the one or more actual completion times of the one or more steps relative to the start time.

EEE 59 is the computer readable medium of EEE 57 or 58, the functions further comprising: receiving, by the computing device, a stop signal indicating that performance of the first service procedure has stopped; receiving, by the computing device, a restart signal indicating that performance of the first service procedure has restarted; and adjusting the expected pace of performance of the first service procedure based on an amount of time elapsed between receiving the stop signal and the restart signal.

EEE 60 is the computer readable medium of any one of EEE 57 to 59, wherein receiving the at least one input signal comprises receiving one or more audible input signals indicative of completion of the one or more steps.

EEE 61 is the computer readable medium of any one of EEE 57 to 60, wherein receiving the at least one input signal comprises receiving video data from a camera coupled to the computing device, wherein at least a portion of the video data is indicative of the vehicle during performance of the first service procedure.

EEE 62 is the computer readable medium of EEE 61, the functions further comprising: identifying a stop in performance of the first service procedure at a stop time based on the video data; identifying a restart in performance of the first service procedure at a restart time based on the video data; and adjusting the expected pace of performance of the first service procedure based on an amount of time elapsed between the stop time and the restart time.

EEE 63 is the computer readable medium of EEE 61 or 62, the functions further comprising: determining a percentage of time spent performing the first service procedure on the vehicle based on the video data; and adjusting the expected pace of performance of the first service procedure based on the percentage of time spent performing the first service procedure on the vehicle.

EEE 64 is the computer readable medium of any one of EEE 57 to 63, the functions further comprising: determining an effective pay rate for the first service procedure, wherein the effective pay rate comprises a base pay rate that is adjusted based on the current pace of performance relative to the expected pace of performance; and providing for display of the effective pay rate on the display interface of the computing device.

EEE 65 is the computer readable medium of any one of EEE 57 to 64, the functions further comprising: receiving at least one target completion time for at least one step of the plurality of steps of the first service procedure; and determining the expected pace of performance of the first service procedure based on the at least one target completion time for the at least one step.

EEE 66 is the computer readable medium of any one of EEE 57 to 65, the functions further comprising: determining an expected pace of performance of a current step of the first service procedure to complete the current step by an expected completion time for the current step; and determining a current pace of performance of the current step of the first service procedure, wherein the first pace indicator is further representative of the current pace of performance of the current step of the first service procedure relative to the expected pace of performance of the current step of the first service procedure.

EEE 67 is the computer readable medium of any one of EEE 57 to 66, the functions further comprising: determining that an expected completion time for a current step of the first service procedure has been exceeded; transmitting a request for assistance with the current step; receiving at least one response to the request for assistance, wherein the at least one response comprises at least one piece of service information; and providing for display of the at least one piece of service information on the display interface of the computing device.

EEE 68 is the computer readable medium of any one of EEE 57 to 67, the functions further comprising: determining, based on the current pace of performance and the expected pace of performance, that performance of the first service procedure is behind schedule; in response to determining that performance of the first service procedure is behind schedule, transmitting a request for assistance with one or more uncompleted steps of the first service procedure; receiving at least one response to the request for assistance, wherein the at least one response comprises at least one piece of service information for at least one of the one or more uncompleted steps of the first service procedure; and providing for display of the at least one piece of service information on the display interface of the computing device.

EEE 69 is the computer readable medium of any one of EEE 57 to 68, wherein the first pace indicator comprises an indication that performance of the first service procedure is one of behind schedule, on time, or ahead of schedule.

EEE 70 is the computer readable medium of any one of EEE 57 to 69, wherein the first pace indicator comprises an indication of at least one of (i) an elapsed amount of time during performance of the first service procedure and (ii) an amount of time remaining from the target completion time.

EEE 71 is the computer readable medium of any one of EEE 57 to 70, the functions further comprising: determining that a second service procedure has been started; recording an amount of time elapsed during performance of the first service procedure; and providing for display of a second pace indicator on the display interface of the computing device, wherein the second pace indicator is representative of a current pace of performance of the second service procedure relative to an expected pace of performance of the second service procedure.

EEE 72 is the computer readable medium of EEE 71, the functions further comprising: receiving video data from a camera coupled to the computing device; and determining that the second service procedure has been started based on the received video data.

EEE 73 is the computer readable medium of EEE 71 or 72, the functions further comprising: determining that the first service procedure has been resumed; and determining the current pace of performance of the first service procedure based on the recorded amount of time elapsed during performance of the first service procedure.

EEE 74 is the computer readable medium of EEE 73, the functions further comprising: receiving, from a user interface of the computing device, a selection signal indicating a selection of the first pace indicator; and determining that the first service procedure has been resumed based on the selection signal.

EEE 75 is the computer readable medium of any one of EEE 57 to 74, wherein determining the current pace of performance of the first service procedure comprises: providing, by the computing device, at least one query requesting confirmation that at least one of the one or more steps has been completed; receiving, by the computing device, at least one responsive input signal responsive to the at least one query; and determining the current pace of performance of the first service procedure based on the at least one responsive input signal.

EEE 76 is the computer readable medium of any one of EEE 57 to 75, wherein the computing device comprises a head-mountable device with a camera, the functions further comprising: receiving video data from the camera during performance of the first service procedure; and determining the current pace of performance of the first service procedure based at least in part on the received video data.

EEE 77 is the computer readable medium of EEE 76, the functions further comprising: determining a percentage of time that the video data represents at least one of a portion of the vehicle or a vehicle part; determining that the percentage of time is below an expected percentage of time; and in response to determining that the percentage of time is below an expected percentage of time, providing for display of a warning signal on the display interface.

EEE 78 is the computer readable medium of any one of EEE 57 to 77, the functions further comprising: receiving the plurality of expected completion times of the plurality of steps of the first service procedure from a first data source that includes past completion times of vehicle service procedure steps; and providing the one or more actual completion times of the one or more steps to the first data source.

EEE 79 is the computer readable medium of any one of EEE 57 to 78, wherein the at least one input signal comprises at least one detected sound, the functions further comprising: identifying, based on the at least one detected sound, at least one of the one or more actual completion times of the one or more steps of the first service procedure.

EEE 80 is the computer readable medium of any one of EEE 57 to 78, wherein the at least one input signal comprises at least one detected sound, the functions further comprising: identifying, based on at least one frequency of the at least one detected sound, at least one operation performed with a given tool during performance of the first service procedure; and determining at least one of the one or more actual completion times of the one or more steps of the first service procedure based on the at least one identified operation performed with the given tool.

EEE 81 is the computer readable medium of EEE 80, wherein the at least one input signal further comprises video data indicative of the vehicle during performance of the first service procedure, the functions further comprising: identifying, based on the video data, the given tool before identifying the at least one operation performed with the given tool.

EEE 82 is the computer readable medium of any one of EEE 57 to 81, wherein the at least one input signal comprises sensor data received from at least one sensor coupled to at least one piece of vehicle service equipment used in performance of the first service procedure, the functions further comprising: determining at least one of the one or more actual completion times of the one or more steps of the first service procedure based on the received sensor data.

EEE 83 is the computer readable medium of EEE 82, wherein the sensor data is indicative of an amount of fluid dispensed by the at least one piece of vehicle service equipment, the functions further comprising: determining the at least one actual completion time based on when the amount of fluid dispensed reaches a predetermined target amount for the vehicle.

EEE 84 is the computer readable medium of EEE 82, wherein the sensor data is indicative of a number of operations performed on the vehicle with the at least one piece of vehicle service equipment, the functions further comprising: determining the at least one actual completion time based on when the number of operations reaches an expected number for operations for the at least one piece of vehicle service equipment in performance of the first service procedure.

What is claimed is:

1. A method comprising:
   receiving, by a computing device, a first service procedure for servicing a vehicle;
   determining an expected pace of performance of the first service procedure, wherein the expected pace of performance comprises a plurality of expected completion times of a plurality of steps of the first service procedure to complete the first service procedure by a target completion time;
   receiving, by the computing device, at least one input signal during performance of the first service procedure;
   determining, based on the at least one input signal, a current pace of performance of the first service procedure, wherein the current pace of performance of the first service procedure comprises one or more actual completion times of one or more steps of the plurality of steps of the first service procedure; and
   providing for display of a first pace indicator on a display interface of the computing device, wherein the first pace indicator is representative of the current pace of performance of the first service procedure relative to the expected pace of performance of the first service procedure.

2. The method of claim 1, further comprising:
   receiving, by the computing device, a start signal at a start time, wherein the start signal indicates that the first service procedure has been started; and
   determining the one or more actual completion times of the one or more steps relative to the start time.

3. The method of claim 1, further comprising:
   receiving, by the computing device, a stop signal indicating that performance of the first service procedure has stopped;
   receiving, by the computing device, a restart signal indicating that performance of the first service procedure has restarted; and
   adjusting the expected pace of performance of the first service procedure based on an amount of time elapsed between receiving the stop signal and the restart signal.

4. The method of claim 1, wherein receiving the at least one input signal comprises receiving one or more audible input signals indicative of completion of the one or more steps.

5. The method of claim 1, wherein receiving the at least one input signal comprises receiving video data from a camera coupled to the computing device, wherein at least a portion of the video data is indicative of the vehicle during performance of the first service procedure.

6. The method of claim 5, further comprising:
   identifying a stop in performance of the first service procedure at a stop time based on the video data;
   identifying a restart in performance of the first service procedure at a restart time based on the video data; and
   adjusting the expected pace of performance of the first service procedure based on an amount of time elapsed between the stop time and the restart time.

7. The method of claim 5, further comprising:
   determining a percentage of time spent performing the first service procedure on the vehicle based on the video data; and
   adjusting the expected pace of performance of the first service procedure based on the percentage of time spent performing the first service procedure on the vehicle.

8. The method of claim 1, further comprising:
determining an effective pay rate for the first service procedure, wherein the effective pay rate comprises a base pay rate that is adjusted based on the current pace of performance relative to the expected pace of performance; and
providing for display of the effective pay rate on the display interface of the computing device.

9. The method of claim 1, further comprising:
receiving at least one target completion time for at least one step of the plurality of steps of the first service procedure; and
determining the expected pace of performance of the first service procedure based on the at least one target completion time for the at least one step.

10. The method of claim 1, further comprising:
determining an expected pace of performance of a current step of the first service procedure to complete the current step by an expected completion time for the current step; and
determining a current pace of performance of the current step of the first service procedure,
wherein the first pace indicator is further representative of the current pace of performance of the current step of the first service procedure relative to the expected pace of performance of the current step of the first service procedure.

11. The method of claim 1, further comprising:
determining that an expected completion time for a current step of the first service procedure has been exceeded;
transmitting a request for assistance with the current step;
receiving at least one response to the request for assistance, wherein the at least one response comprises at least one piece of service information; and
providing for display of the at least one piece of service information on the display interface of the computing device.

12. The method of claim 1, further comprising:
determining, based on the current pace of performance and the expected pace of performance, that performance of the first service procedure is behind schedule;
in response to determining that performance of the first service procedure is behind schedule, transmitting a request for assistance with one or more uncompleted steps of the first service procedure;
receiving at least one response to the request for assistance, wherein the at least one response comprises at least one piece of service information for at least one of the one or more uncompleted steps of the first service procedure; and
providing for display of the at least one piece of service information on the display interface of the computing device.

13. The method of claim 1, wherein the first pace indicator comprises an indication that performance of the first service procedure is one of behind schedule, on time, or ahead of schedule.

14. The method of claim 1, wherein the first pace indicator comprises an indication of at least one of (i) an elapsed amount of time during performance of the first service procedure and (ii) an amount of time remaining from the target completion time.

15. The method of claim 1, further comprising:
determining that a second service procedure has been started;
recording an amount of time elapsed during performance of the first service procedure; and
providing for display of a second pace indicator on the display interface of the computing device, wherein the second pace indicator is representative of a current pace of performance of the second service procedure relative to an expected pace of performance of the second service procedure.

16. The method of claim 15, further comprising:
receiving video data from a camera coupled to the computing device; and
determining that the second service procedure has been started based on the received video data.

17. The method of claim 15, further comprising:
determining that the first service procedure has been resumed; and
determining the current pace of performance of the first service procedure based on the recorded amount of time elapsed during performance of the first service procedure.

18. The method of claim 17, further comprising:
receiving, from a user interface of the computing device, a selection signal indicating a selection of the first pace indicator; and
determining that the first service procedure has been resumed based on the selection signal.

19. The method of claim 1, wherein determining the current pace of performance of the first service procedure comprises:
providing, by the computing device, at least one query requesting confirmation that at least one of the one or more steps has been completed;
receiving, by the computing device, at least one responsive input signal responsive to the at least one query; and
determining the current pace of performance of the first service procedure based on the at least one responsive input signal.

20. The method of claim 1, wherein the computing device comprises a head-mountable device with a camera, the method further comprising:
receiving video data from the camera during performance of the first service procedure; and
determining the current pace of performance of the first service procedure based at least in part on the received video data.

21. The method of claim 20, further comprising:
determining a percentage of time that the video data represents at least one of a portion of the vehicle or a vehicle part;
determining that the percentage of time is below an expected percentage of time; and
in response to determining that the percentage of time is below an expected percentage of time, providing for display of a warning signal on the display interface.

22. The method of claim 1, further comprising:
receiving the plurality of expected completion times of the plurality of steps of the first service procedure from a first data source that includes past completion times of vehicle service procedure steps; and
providing the one or more actual completion times of the one or more steps to the first data source.

23. The method of claim 1, wherein the at least one input signal comprises at least one detected sound, the method further comprising:

identifying, based on the at least one detected sound, at least one of the one or more actual completion times of the one or more steps of the first service procedure.

24. The method of claim 1, wherein the at least one input signal comprises at least one detected sound, the method further comprising:
identifying, based on at least one frequency of the at least one detected sound, at least one operation performed with a given tool during performance of the first service procedure; and
determining at least one of the one or more actual completion times of the one or more steps of the first service procedure based on the at least one identified operation performed with the given tool.

25. The method of claim 24, wherein the at least one input signal further comprises video data indicative of the vehicle during performance of the first service procedure, the method further comprising:
identifying, based on the video data, the given tool before identifying the at least one operation performed with the given tool.

26. The method of claim 1, wherein the at least one input signal comprises sensor data received from at least one sensor coupled to at least one piece of vehicle service equipment used in performance of the first service procedure, the method further comprising:
determining at least one of the one or more actual completion times of the one or more steps of the first service procedure based on the received sensor data.

27. The method of claim 26, wherein the sensor data is indicative of an amount of fluid dispensed by the at least one piece of vehicle service equipment, the method further comprising:
determining the at least one actual completion time based on when the amount of fluid dispensed reaches a predetermined target amount for the vehicle.

28. The method of claim 26, wherein the sensor data is indicative of a number of operations performed on the vehicle with the at least one piece of vehicle service equipment, the method further comprising:
determining the at least one actual completion time based on when the number of operations reaches an expected number for operations for the at least one piece of vehicle service equipment in performance of the first service procedure.

29. A computing device comprising:
a display interface;
one or more processors;
a non-transitory computer readable medium; and
program instructions stored on the non-transitory computer readable medium and executable by the one or more processors to:
receive a first service procedure for servicing a vehicle;
determine an expected pace of performance of the first service procedure, wherein the expected pace of performance comprises a plurality of expected completion times of a plurality of steps of the first service procedure to complete the first service procedure by a target completion time;
receive at least one input signal during performance of the first service procedure;
determine, based on the at least one input signal, a current pace of performance of the first service procedure, wherein the current pace of performance of the first service procedure comprises one or more actual completion times of one or more steps of the plurality of steps of the first service procedure; and
provide for display of a first pace indicator on the display interface, wherein the first pace indicator is representative of the current pace of performance of the first service procedure relative to the expected pace of performance of the first service procedure.

30. A non-transitory computer readable medium having stored therein instructions executable by one or more processors to cause a computing system to perform functions comprising:
receiving a first service procedure for servicing a vehicle;
determining an expected pace of performance of the first service procedure, wherein the expected pace of performance comprises a plurality of expected completion times of a plurality of steps of the first service procedure to complete the first service procedure by a target completion time;
receiving at least one input signal during performance of the first service procedure;
determining, based on the at least one input signal, a current pace of performance of the first service procedure, wherein the current pace of performance of the first service procedure comprises one or more actual completion times of one or more steps of the plurality of steps of the first service procedure; and
providing for display of a first pace indicator on a display interface of a computing device, wherein the first pace indicator is representative of the current pace of performance of the first service procedure relative to the expected pace of performance of the first service procedure.

* * * * *